(12) United States Patent
Lee et al.

(10) Patent No.: US 11,271,523 B2
(45) Date of Patent: Mar. 8, 2022

(54) PHOTOVOLTAIC MODULE, TRUNK CABLE, AND PHOTOVOLTAIC MODULE INCLUDING THE SAME

(71) Applicant: LG ELECTRONICS INC., Seoul (KR)

(72) Inventors: Hyeonjae Lee, Seoul (KR); Joongtae Kim, Seoul (KR); Youngchan Park, Seoul (KR); Juhwan Yun, Seoul (KR); Suchang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/125,040

(22) Filed: Sep. 7, 2018

(65) Prior Publication Data
US 2019/0074794 A1   Mar. 7, 2019

(30) Foreign Application Priority Data

Sep. 7, 2017   (KR) .................. 10-2017-0114662
Sep. 3, 2018   (KR) .................. 10-2018-0104515

(51) Int. Cl.
*H02S 40/34*   (2014.01)
*H02S 40/32*   (2014.01)
(Continued)

(52) U.S. Cl.
CPC ......... *H02S 40/34* (2014.12); *H02M 3/33507* (2013.01); *H02M 7/5387* (2013.01);
(Continued)

(58) Field of Classification Search
None
See application file for complete search history.

(56) References Cited

U.S. PATENT DOCUMENTS 6,462,265 B1 * 10/2002 Sasaoka ................ H01L 31/048
136/251
7,824,191 B1 * 11/2010 Browder ........... H01L 31/02021
439/76.1
(Continued)

OTHER PUBLICATIONS

Wu, Tzong-Lin et al., "Overview of Power Integrity Solutions on Package and PCB: Decoupling and EBG Isolation", IEEE Transactions on Electromagnetic Compatibility, vol. 52, No. 2, May 2010, pp. 346-356. (Year: 2010).*

*Primary Examiner* — Tamir Ayad
(74) *Attorney, Agent, or Firm* — Birch, Stewart, Kolasch & Birch, LLP

(57) ABSTRACT

A photovoltaic module includes: a photovoltaic solar cell module; a junction box disposed on a back surface of the photovoltaic solar cell module, and to convert a DC power from the photovoltaic solar cell module to an AC power; and a first cable electrically connected to the junction box and to output the AC power. The junction box includes an insulating case having an insulating material, and disposed on the back surface of the photovoltaic solar cell module, and a circuit board within the insulating case, and mounted thereon a converter for converting a level of the DC power from the photovoltaic solar cell module, and an inverter for converting a DC power from the converter into an AC power. Th first cable includes first and second conductive lines for outputting the AC power output from the circuit board to the outside, without a grounding line.

13 Claims, 15 Drawing Sheets

(51) Int. Cl.
  *H02S 40/36* (2014.01)
  *H02M 7/5387* (2007.01)
  *H02M 3/335* (2006.01)
  *H02M 1/00* (2006.01)

(52) U.S. Cl.
  CPC .............. *H02S 40/32* (2014.12); *H02S 40/36* (2014.12); *H02M 1/007* (2021.05); *H02M 1/0009* (2021.05)

(56) References Cited

U.S. PATENT DOCUMENTS

| | | | | |
|---|---|---|---|---|
| 2015/0103496 | A1* | 4/2015 | Anderson | H02S 40/32 361/729 |
| 2015/0214889 | A1* | 7/2015 | Nam | H02S 30/10 136/251 |
| 2016/0308488 | A1* | 10/2016 | Liu | H02S 40/34 |
| 2018/0234642 | A1* | 8/2018 | Langley | H01L 23/552 |

* cited by examiner

PHOTOVOLTAIC MODULE, TRUNK CABLE, AND PHOTOVOLTAIC MODULE INCLUDING THE SAME

CROSS-REFERENCE TO RELATED APPLICATION

This application claims the priority benefit of Korean Patent Applications No. 10-2017-0114662, filed on Sep. 7, 2017, and No. 10-2018-0104515, filed on Sep. 3, 2018 in the Korean Intellectual Property Office, the disclosure of each which is incorporated herein by reference in its entirety.

BACKGROUND OF THE INVENTION

1. Field of the Invention

The present invention relates to a photovoltaic module, trunk cable, and photovoltaic module including the same, and more particularly to a photovoltaic module, trunk cable, and photovoltaic module including the same in which a size of a junction box is compactly realized.

2. Description of the Related Art

Due to increased energy consumption, there is a growing concern over expected rapid depletion of existing energy sources, such as petroleum and coal. Thus, alternative energy sources, as alternatives to the existing energy sources, have been getting a lot of attention in recent years. Among the alternative energy sources, a photovoltaic solar cell is highlighted as a next-generation battery that converts solar energy directly into a flow of electrons using a semiconductor element.

On the other hand, a photovoltaic module is obtained by connecting photovoltaic solar cells in series or in parallel for generating electric power using sunlight. The photovoltaic module includes a junction box that collects electricity which is generated by the photovoltaic solar cells.

On the other hand, various circuit elements are arranged within a junction box, and thus, grounding and insulation are important factors. In this regard, an arrangement of circuit elements within a metal case is disclosed in Korean Unexamined Patent Application Publication No. 10-20150089341. However, a disadvantage with this arrangement is that a separate insulating member is disposed within the metal case in order to insulate the circuit elements within the metal case.

SUMMARY OF THE INVENTION

An object of the present invention is to provide a photovoltaic module, trunk cable, and photovoltaic module including the same in which a size of a junction box is compactly realized.

According to an embodiment of the present invention, there is provided a photovoltaic module including: a photovoltaic solar cell module; a junction box disposed on a back surface of the photovoltaic solar cell module and configured to convert a DC power from the photovoltaic solar cell module; and a first cable electrically connected to the junction box and configured to output the AC power from the junction box; in which the junction box includes an insulating case including an insulating material, and disposed on the back surface of the photovoltaic solar cell module, and a circuit board within the insulating case, and on which a converter and an inverter are mounted, the converter for converting a level of the DC power from the photovoltaic solar cell module and the inverter for converting a DC power from the converter into an AC power, and in which the first cable includes first and second conductive lines for outputting the AC power output from the circuit board, to the outside, and the first cable not including a grounding line.

According to another embodiment of the present invention, there is provided a photovoltaic module including: a photovoltaic solar cell module; a first junction box disposed on a back surface of the photovoltaic solar cell module and including a bypass diode for bypassing a DC power from the photovoltaic solar cell module; a second junction box separated from the first junction box and configured to convert the DC power from the first junction into an AC power; and a cable electrically connected to the second junction box and to output the AC power; in which the second junction box includes an insulating case including an insulating material, and disposed on the back surface of the photovoltaic solar cell module, a circuit board within the insulating case, and on which a converter and an inverter are mounted, the converter for converting a level of the DC power from the photovoltaic solar cell module, and the inverter for converting a DC power from the converter into an AC power, and in which the cable includes first and second conductive lines for outputting the AC power output from the circuit board to the outside, the cable not including a grounding line.

According to an embodiment of the present invention, there is provided a trunk cable including: a cable through which an AC power input from an adjacent first solar cell module flows; an interface unit including a first connector connected to a connector of a single output cable through which an AC power from the junction box flows, and a second connector for outputting the AC power of the junction box to an adjacent second solar module, wherein the AC power of the cable from an end of the cable is input to the interface unit; and a third connector connected to another end of the cable, wherein the cable includes first and second conductive lines for outputting the AC power of the cable to the interface unit, the cable not including a grounding line.

According to embodiment of the present invention, there is provided a photovoltaic system including: a plurality of photovoltaic solar cell modules; a plurality of junction boxes to convert a DC power from respective photovoltaic solar cell modules into an AC power; a plurality of single output cables electrically connected to respective junction boxes and including first and second conductive lines for outputting the AC power, the plurality of single output cables not including a grounding line; and a plurality of trunk cables connected to respective single output cables for outputting the AC power.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

The present invention will be described in more detail below with reference to the drawings.

The terms "module" and "unit" that will be used in the following description to name a constituent element are assigned only for ease of description in the present specification, and are not in themselves intended particularly to attach an important meaning or to provide important functionality. Therefore, the terms "module" and "unit" are interchangeably used.

Figure 1:
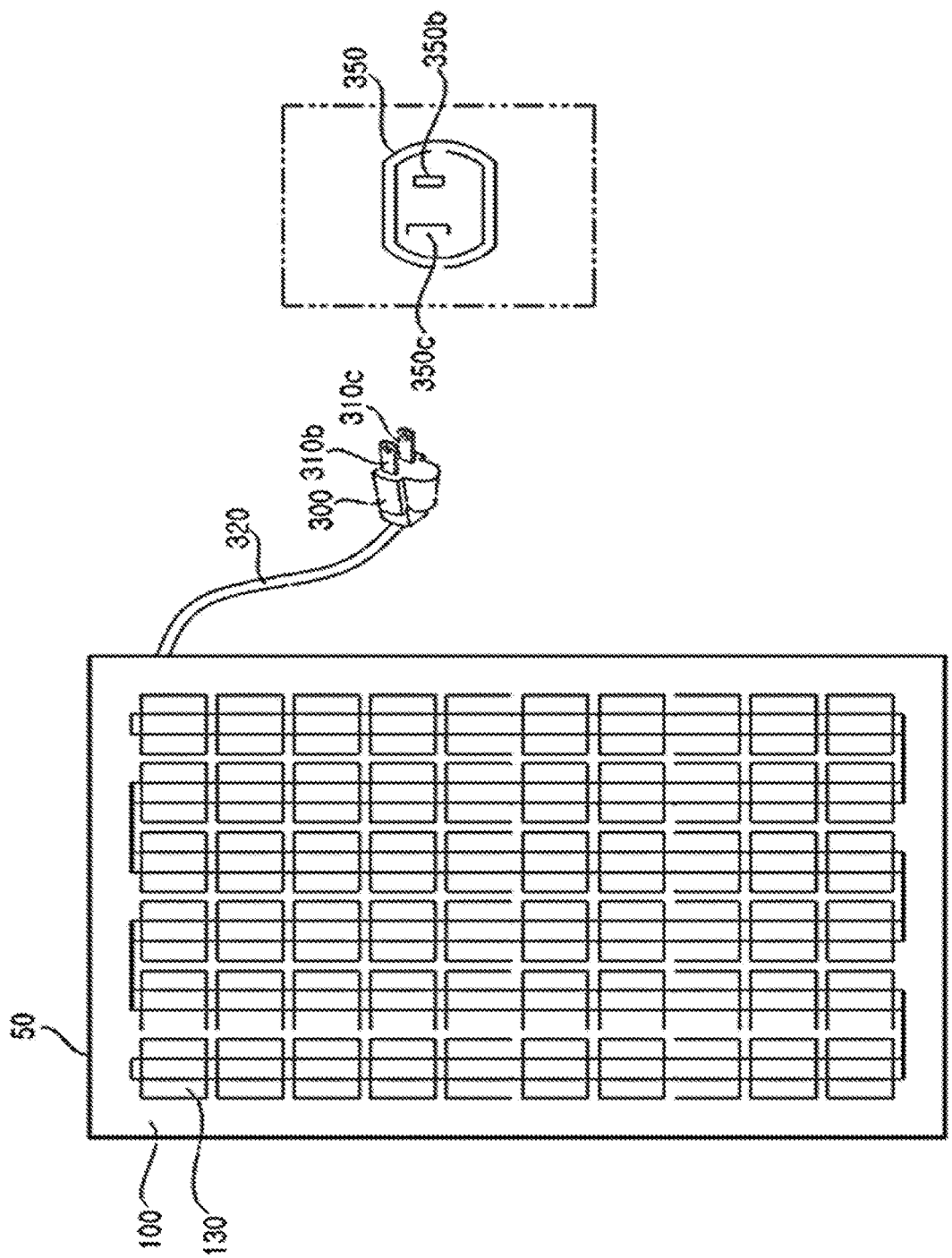
FIG. 1 is a front-view diagram of a photovoltaic module according to an embodiment of the present invention.
Figure 2:
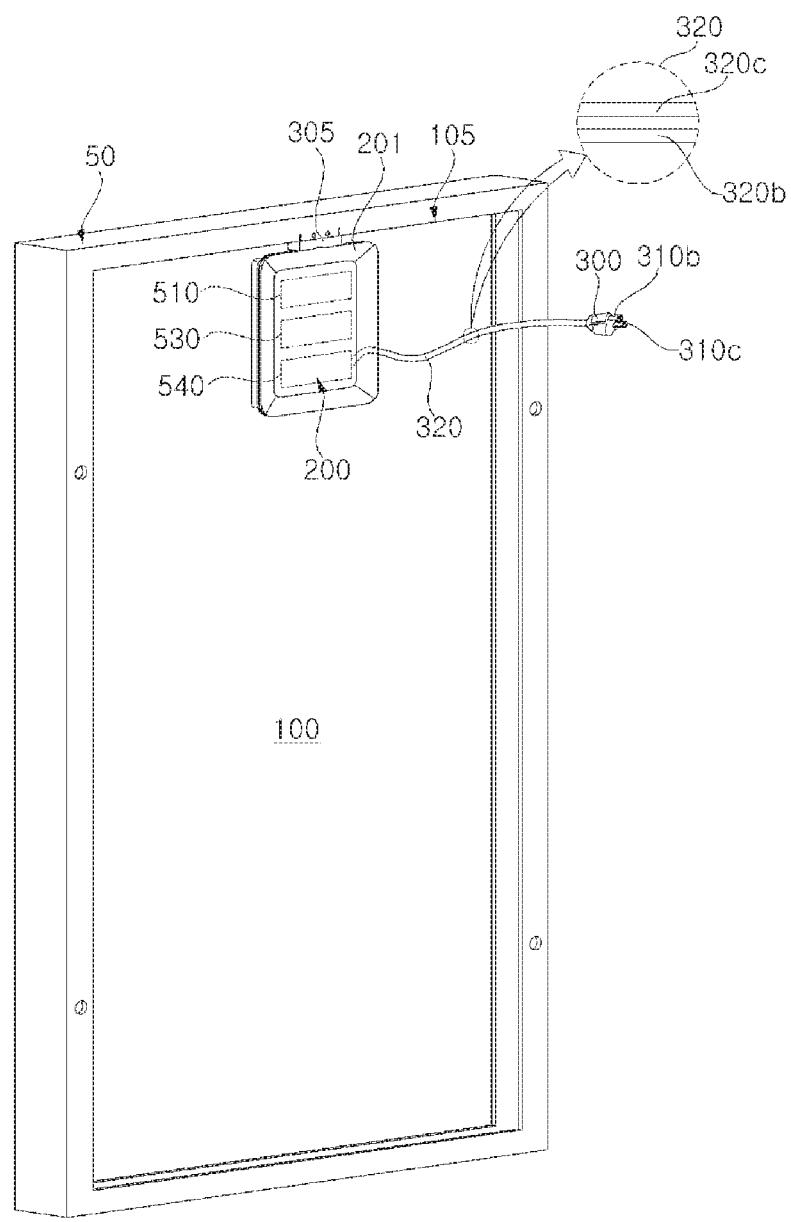
FIG. 2 is a back-view diagram of the photovoltaic module in FIG. 1.

FIG. 1 is a front-view diagram of a photovoltaic module according to an embodiment of the present invention. FIG. 2 is a back-view diagram of the photovoltaic module in FIG. 1. All the components of the photovoltaic module according to all embodiments of the present invention are operatively coupled and configured.

For description with reference with the drawings, the photovoltaic module 50 according to the embodiment of the present invention includes a photovoltaic solar cell module 100 and a junction box 200 having a top 201 disposed on the back surface of the photovoltaic solar cell module 100. The photovoltaic solar cell module 100 can also be referred to as a photovoltaic module, a photovoltaic module or a solar cell module. A holder 305 is connected to the junction box 200.

First, the photovoltaic solar cell module 100 includes a plurality of photovoltaic solar cells 130. The photovoltaic solar cells 130 can also be referred to as photovoltaic cells or solar cells.

The photovoltaic solar cell 130 is a semiconductor element that converts solar energy into a flow of electrons, and is a silicon solar cell, a compound semiconductor solar cell, a tandem solar cell, a dye-sensitized solar cell, a CdTe thin-film solar cell, a CIGS thin-film solar cell, a thin-film solar cell, or the like.

The photovoltaic solar cells 130 are electrically connected in series or in parallel, or in both ways.

In the drawings, it is illustrated that ten photovoltaic solar cells 130 are connected to each other to constitute one string, and a total of six strings are connected in series to each other, but various modifications to this connection method are possible.

On the other hand, the photovoltaic module 50 according to the embodiment of the present invention includes the photovoltaic solar cell module 100, the junction box 200 disposed on the back surface of the photovoltaic solar cell module 100, converts a DC power from the photovoltaic solar cell module 100 and outputs an AC power that results from the conversion, and a cable 320 electrically connected to the junction box 200 and over which the AC power is output.

Then, the junction box 200 includes an insulating case 491, 492 including an insulating material, and disposed on the back surface of the photovoltaic solar cell module 100, a circuit board 37 disposed on the insulating case 491,492 and on which a converter 530 that converts a level of the DC power from the photovoltaic solar cell module 100 and an inverter 540 that converts a DC power from the converter 530 into an AC power are mounted. Accordingly, a separate insulating member does not need to be arranged within the junction box 200, and thus, a size of the junction box 200 is compactly realized. Particularly, the thickness of the junction box 200 is reduced.

On the other hand, the insulating case 491, 492 may made by resin of at least one of polycarbonate, polyethylene, polyethylene ether, and polystyrene.

On the other hand, a feature of the cable 320 is that, without including a grounding line, the cable 320 includes first and second conductive lines 320b and 320c for outputting the AC power output from the circuit board 37, to the outside.

Accordingly, the cable 320 is to pass through one through-hole formed in the junction box 200 and then to be electrically connected to the junction box 200 without a grounding line. Thus, the size of the cable 320 is compactly realized. In addition, a manufacturing cost is reduced.

Particularly, the converter 530 and the inverter 540 within the circuit board 37 are electrically connected to a floating ground FGND. This provides an advantage in that a separate ground does not need to be separately formed.

On the other hand, the solar module 50 may include a connector connected to an end of the cable 320 for outputting an AC power to an adjacent solar module or the outside. The connector may be electrically connected to an inlet, an outlet, a grid, a smart meter, or a gateway.

For example, the photovoltaic module 50 may include a plug 300 for outputting the AC power from the cable 320 to the adjacent photovoltaic module or the outside.

As illustrated in FIG. 1, as illustrated in FIG. 1, the plug 300 includes first and second protrusion portions 310b and 310c corresponding to the first and second conductive lines 320b and 320, respectively, and thus the size of the plug 300 is compactly realized.

On the other hand, the first and second conductive lines 320b and 320c are L lines or neutral lines for transmitting an electrical signal.

On the other hand, a first power terminal 310b and a second power terminal 310c are hot terminals or neutral terminals in compliance with North American standards.

On the other hand, the plug 300 that includes the first power terminal 310b and the second power terminal 310c is possibly connected to each of the terminals 350b and 350c of the outlet 350 disposed inside of or outside of a building. With this connection, the AC power from the photovoltaic module 50 is simply supplied to a grid through the outlet 350 inside of or outside of the building.

The use of this method according to the present invention makes unnecessary a separate device for connecting the photovoltaic module and the outlet, thereby improving user convenience. Particularly, without the separate help of a service provider, a purchaser of the photovoltaic module simply installs the photovoltaic module inside of the building, and simply connects the photovoltaic module to the outlet 350 through the use of the plug 300.

On the other hand, with reference to FIG. 2, the junction box 200 includes a bypass diode unit 510, the converter 530, a capacitor C1, the inverter 540, and a controller 550. The detail of this will be described below with reference to FIG. 9 and subsequent figures.

On the other hand, according to the embodiment of the present invention, the junction box 200 includes an insulating case, and a circuit board is disposed within the insulating case. Accordingly, the junction box 200 does not need to be attached to a frame 105 in order to ground the junction box 200, and, as in the drawings, is possibly disposed on the back surface of the photovoltaic solar cell module 100 so that the junction box 200 is at a predetermined distance Dr away from the frame 105.

Figure 3:
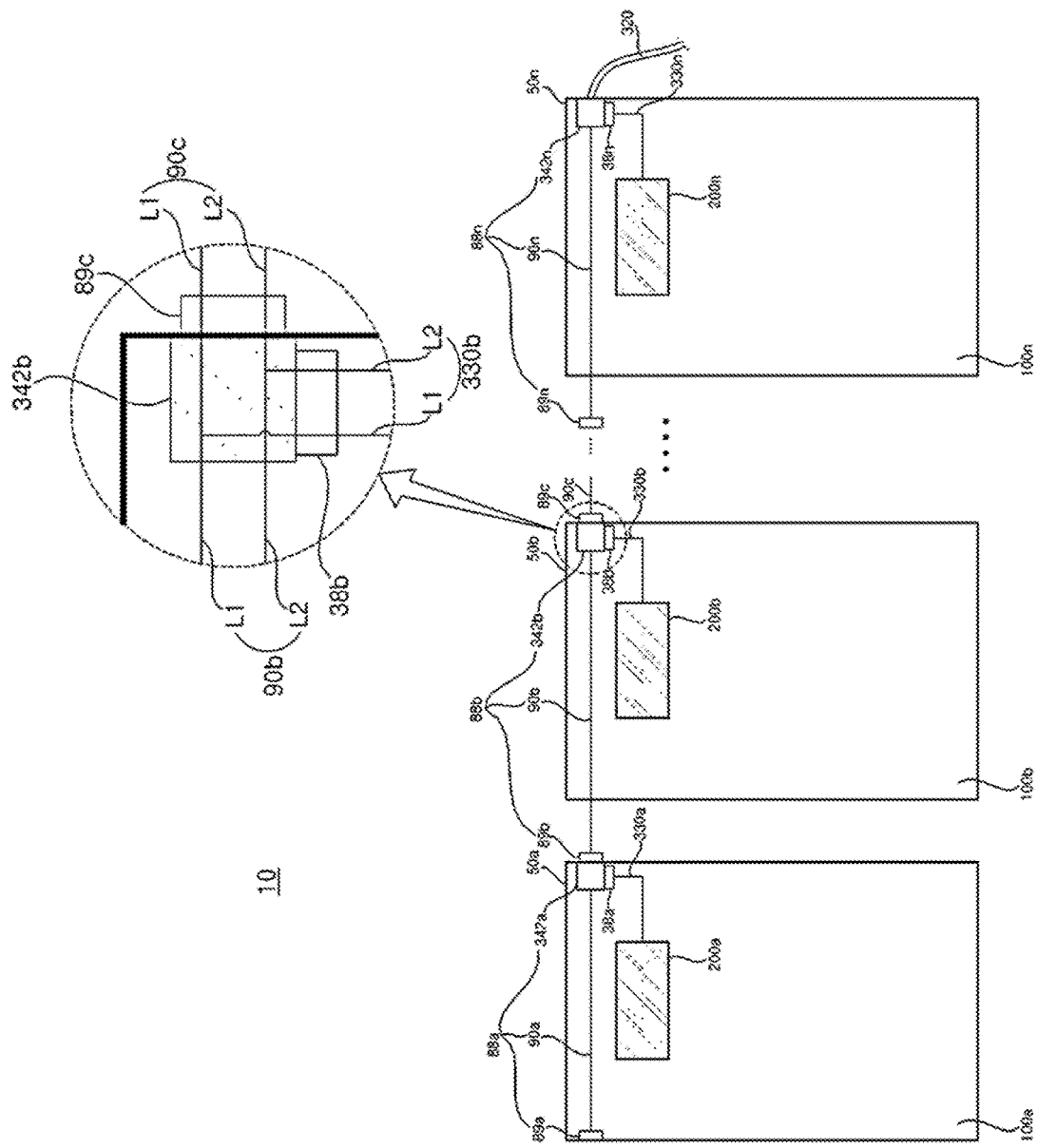
FIG. 3 is an example of a diagram of a configuration of a photovoltaic system according to the embodiment of the present invention.

FIG. 3 is an example of a diagram of a configuration of a photovoltaic system according to the embodiment of the present invention.

For description with referring to the drawings, a photovoltaic system 10 according to the embodiment of the present invention includes a plurality of photovoltaic solar cell modules, photovoltaic solar cell modules 100a, 100b, and so forth up to 100n, a plurality of junction boxes, junction boxes 200a, 200b, and so forth up to 200n that output AC powers, respectively, that may convert a DC power from the respective photovoltaic solar cell modules into an AC power, a plurality of cables, cables 330a, 330b, and so forth up to 330n that output AC powers, respectively, that are output from the plurality of photovoltaic solar cell modules, the photovoltaic solar cell modules 100a, 100b, and so forth up to 100n, respectively, a plurality of trunk cables, trunk cables 88a, 88b, and so forth up to 88n that output AC powers from the respective junction boxes, and a cable 320 connected to nth photovoltaic modules 50n.

The cables 330a, 330b, . . . , and 330n may comprise the first and second conductive lines for externally outputting AC power output from the circuit board 37 in the junction boxes 200a, 200b, and may be not provided with a ground line. Accordingly, each of the cables 330a, 330b, . . . , 330n may be referred to as a single output cable.

The plurality of trunk cables 88a, 88b, . . . , 88n may comprise the cables 90a, 90b, . . . , 90n through which the AC power input from the adjacent solar modules flows, the plurality of interface units 342a, 342b, and 342n to input AC power from one end from the cables 90a, 90b, . . . , 90n, and a plurality of third connecters 89a, 89b, . . . , 89n, connected to the other of the cables 90a, 90b, . . . , 90n, respectively.

The plurality of interface units 342a, 342b, . . . , and 342n may include the plurality of first connectors 902a, 902b, . . . , 902n connected to connectors 38a, 38b, . . . , 38n of the cables 330a, 330b, . . . , 330n, respectively, and the plurality of second connectors 904a, 904b, . . . , 904n for outputting an AC power to adjacent second solar module.

On the other hand, the cables 90a, 90b, . . . , and 908n in the trunk cables 88a, 88b, . . . , 88n may include third and second conductive lines, respectively, and may not grounding lines, respectively.

On the other hand, the AC power from the connectors 89a, 89b, . . . , 89n and the AC power from the junction boxes 200a, 200b, . . . , 200n via the interface units 342a, 342b, . . . , may be merged and output to the outside.

On the other hand, the ends of the plurality of cables 330a, 330b, . . . , 330n for outputting the AC power output from the junction boxes 200a, 200b, . . . , 200n may be connected to the connectors 38a, 38b, . . . , 38n, for coupling with the interfaces 342a, 342b, . . . , 38n.

That is, connectors 38a, 30b, . . . , 38n may be connected for connection between the plurality of cables 330a, 330b, . . . , 330n and the interfaces 342a, 342b, . . . , 342n.

Meanwhile, the cable 320 connected to the nth photovoltaic module 50n may be electrically connected to an inlet, an outlet, a grid, a smart meter, or a gateway. The cable 320 may include first and second conductive lines 320b and 320c and may not include a ground line.

Figure 4:
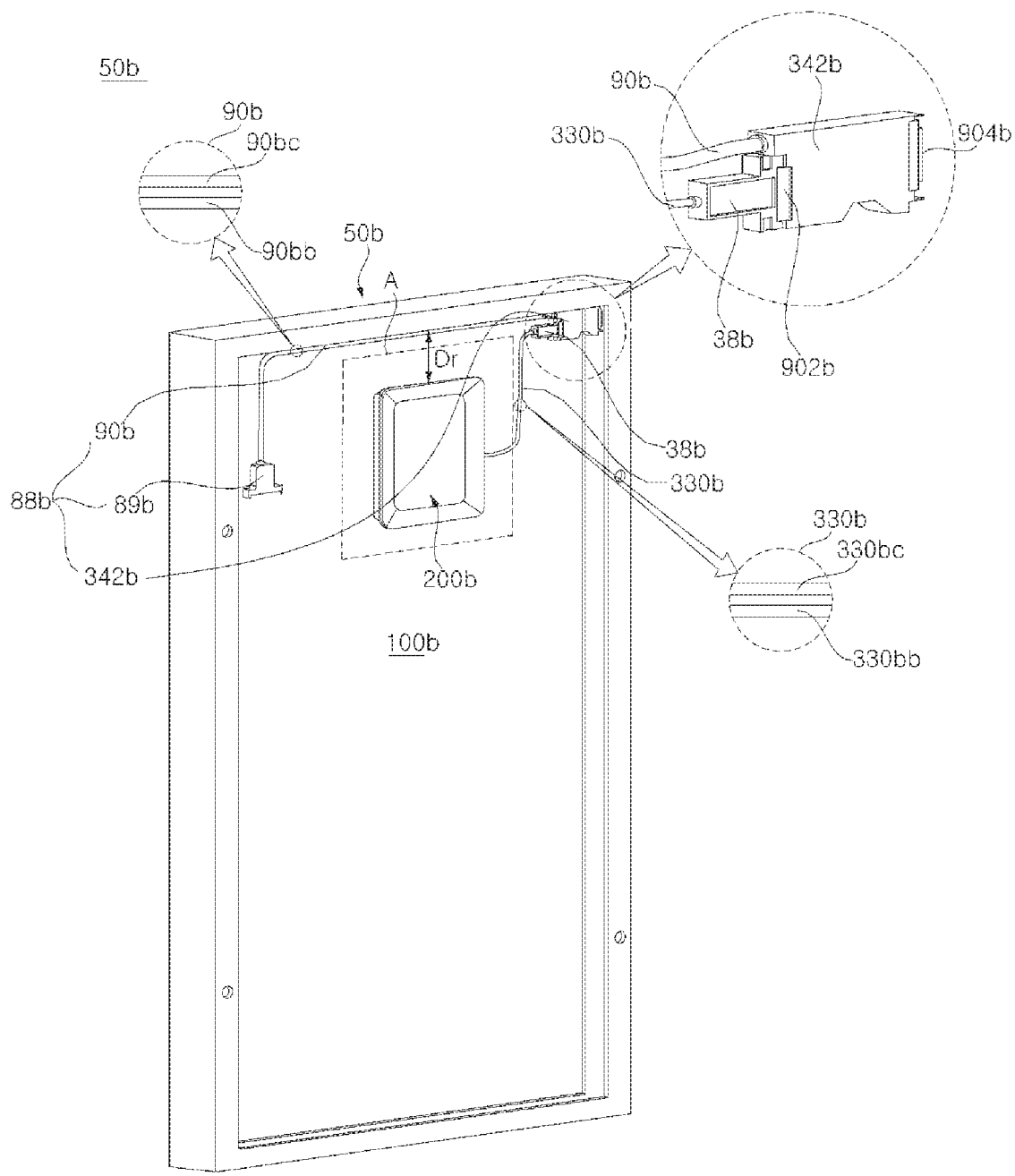
FIG. 4 is a back-view diagram of a second photovoltaic module in FIG. 3.

FIG. 4 is a back-view diagram of a second photovoltaic module in FIG. 3.

With reference to the drawings, a junction box 200b, an interface unit 342b, the cable 330b for outputting AC power from the junction box 200b, a connector 38b connected to the cable 330b, and the trunk cable 88b are arranged on the back surface of the second photovoltaic module 50b.

On the other hand, the junction box 200b includes an insulating case, and a circuit board is disposed within the insulating case. Accordingly, the junction box 200b does not need to be attached to the frame 105 in order to ground the junction box 200b, and, as in the drawings, is possibly disposed on the back surface of the photovoltaic solar cell module 100 so that the junction box 200b is at the predetermined distance Dr away from the frame 105.

The connector 89b of the trunk cable 88b receives input of an AC power from a nearby photovoltaic module. For example, the connector 89b may be connected to the second connector 902a of the interface unit 342a of the adjacent photovoltaic module 50a.

On the other hand, a cable 90b of a trunk cable 90b is provided to electrically connect between the connector 89b and the interface unit 342b.

On the other hand, the trunk cable 88b includes a cable 90b through which an AC power input from an adjacent first solar cell module flows, an interface unit 342b including a first connector 902b connected to a connector 38b of a single output cable 330b through which an AC power from the junction box 200b flows, and a second connector 904b for outputting an AC power to an adjacent second solar module, and a third connector 89b connected to the other end of the cable 90b.

One of the connector 38b and the first connector 902b may have a male connector structure and the other may have a male connector structure in which a male connector structure is inserted.

By way of example, the connector 38b may have a male connector structure and the first connector 902b may have a female connector structure to more easily move the connector 38b into the first connector 902b, 38b and the first connector 902b. However, the present invention is not limited thereto.

The second connector 904b is a portion to which the third connector 89b of the neighboring solar module 50 is connected. The neighboring solar modules 50 can be connected to each other or connected to a power network or a power system by connecting the second connector 904b and the third connector 89b of the neighboring solar module 50. One of the second connector 904b and the third connector 89b may have a male connector structure and the other may have a male connector structure into which a male connector structure is inserted. The second connector 904b has a male connector structure and the third connector 89b has a female connector structure so that the second connector 904b can move more easily than the third connector 89b of the interface portion 342b 89b, the second connector 904b and the third connector 89*b* can be connected more easily. However, the present invention is not limited thereto.

On the other hand, the cable 90*b* of the trunk cable 90*b* includes two conductive lines 90*bb* and 90*bc* without a grounding line.

On the other hand, a feature of the cable 330*b* is that, without including a grounding line, the cable 330*b* includes two conductive lines, conductive lines 330*bb* and 330*bc*, for outputting the AC power output from the circuit board 37 within the junction box 200*b*, to the outside.

Accordingly, the cable 330*b* is to pass through one through-hole formed in the junction box 200 and then to be electrically connected to the junction box 200*b* without a grounding line. Thus, the size of the cable 330*b* is compactly realized. In addition, a manufacturing cost is reduced.

On the other hand, a feature of the cable 330*b* is that without including a grounding line, the cable 330*b* includes third and fourth conductive lines 330*bb* and 330*cb*. Accordingly, the cable 330*b* is configured without a separate grounding line, and thus the size of the cable 320*b* is compactly realized. In addition, the manufacturing cost is reduced.

Figure 5:
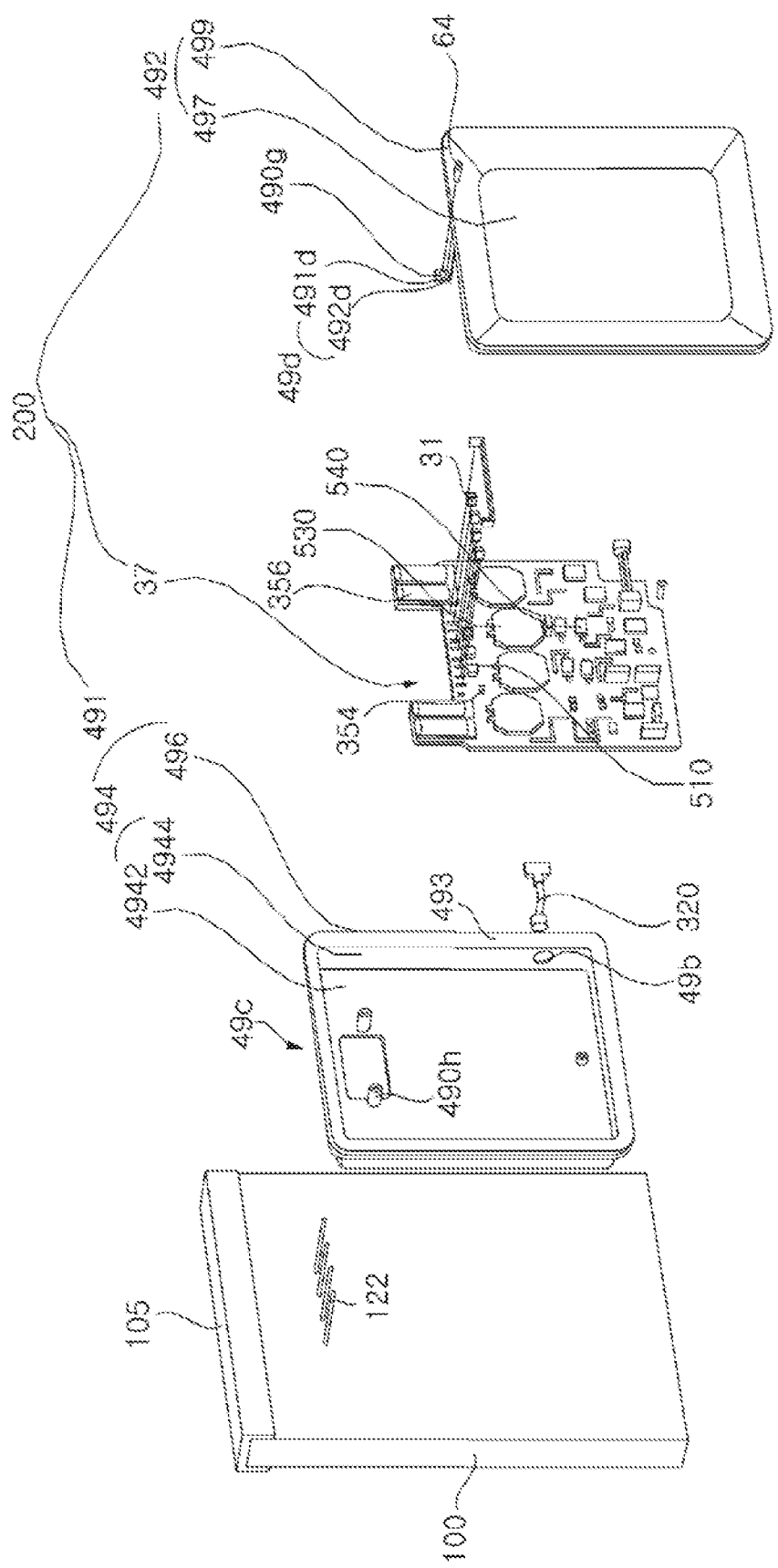
FIG. 5 is a perspective exploded diagram of a junction box in FIG. 2.

FIG. 5 is a perspective exploded diagram of the junction box in FIG. 2.

With reference to the drawings, the junction box 200 according to the embodiment of the present invention has a terminal 31 connected to the photovoltaic solar cell 130 and/or the bypass diode unit 510 electrically connected to the terminal 31, and the inverter 540 electrically connected to the bypass diode unit 510.

At this time, the terminal 31 is connected to a ribbon 122 drawn from the photovoltaic solar cell 130.

The terminal 31, the terminal 31, the bypass diode unit 510, the converter 530, the inverter 540, and the like within the junction box 200 according to the present embodiment are mounted together on the circuit board 37. Accordingly, it can be said that the terminal 31, the bypass diode unit 510, the converter 530, and the inverter 540 are integrally combined with each other using the circuit board 37.

The junction box 200 according to the present embodiment includes the first insulating case 491 and the second insulating case 492 that are integrally joined to each other to be formed into one case, and the circuit board 37.

Specifically, the junction box 200 includes the first insulating case 491 disposed on the back surface of the photovoltaic solar cell module 100, the circuit board 37 disposed on the first insulating case 491 and on which the converter 530 that converts the level of the DC power from the photovoltaic solar cell module 100 and the inverter 540 that converts the DC power from the converter 530 into an AC power are mounted, and the second insulating case 492 joined to the first insulating case 491 and is disposed on the circuit board 37.

Accordingly, the terminal 31, the bypass diode unit 510, the converter 530, and the inverter 540 that are disposed inside of the junction box 200 are easy to take out of the junction box 200 and to put into the junction box 300, in a state where the first insulating case 491 and the second insulating case 492 are separated. Furthermore, the terminal 31, the bypass diode unit 510, the converter 530, and the inverter 540 that are disposed inside of the junction box 200 are stably held in place in a state where the first insulating case 491 and the second insulating case 492 are combined.

The junction box 200 has a structure for connection to the photovoltaic solar cell 130 and the outside (for example, another photovoltaic solar cell module 100 or an electric power network).

That is, the junction box 200 includes a first through-hole 49*a* and a second through-hole 49*b*. The ribbon 122 for the connection to the photovoltaic solar cell 130 passes through the first through-hole 49*a*. One cable, the alternating-current output cable 320, over which an AC voltage generated by the junction box 200 is transmitted, passes through the second through-hole 49*b*.

That is, the first through-hole 49*a* for the connection to the photovoltaic solar cell 130 and the second through-hole 49*b* for the alternating-current output cable 320 are formed in the same junction box 200.

As one example, the first through-hole 49*a* is formed in the surface (a bottom surface 4942 of the first insulating case 491) adjacent to the photovoltaic solar cell module 100.

Then, the ribbon drawn from the photovoltaic solar cell 130 passes through a hole (not illustrated) formed in a second sealing layer 14*b* and a rear-surface board 18. The ribbon 122 drawn by passing through the hole is connected, along a shorter path, to the terminal 31.

The first through-hole 49*a* may be one hole through which a plurality of ribbons 122 (n ribbons) corresponding to photovoltaic solar cell strings, respectively, pass, and may include a plurality of holes corresponding to the plurality of ribbons 122, respectively, and be arranged distances away from each other.

In the drawings, a structure is illustrated in which not only formation of one hole, the thorough-hole 49*a*, through which the plurality of ribbons 122 pass together, but also processing of the first insulating case 491 is more easily performed.

The second through-hole 49*b* is formed in a position in which a connection to an external circuit is easily made.

As one example, according to the present embodiment, the second through-hole 49*b* is disposed in a flank surface 4944 further away from the terminal 31, and thus a voltage provided to the terminal 31 from the photovoltaic solar cell module 100 passes through the bypass diode unit 510 and the junction box 200 sequentially, and then is output to the outside through the alternating-current output cable 320.

Accordingly, the terminal 31, the bypass diode unit 510, the converter 530, and the inverter 540 are efficiently arranged.

On the other hand, according to the present embodiment, it is illustrated that an output cable drawn from the circuit board 37 is the alternating-current output cable 320.

Accordingly, the alternating-current output cable 320 is drawn to the outside through the second through-hole 49*b*.

On the other hand, as described with reference to FIG. 1, the alternating-current output cable 320 only includes the first and second conductive lines 320*b* and 320*c* without a grounding line.

That is, the alternating-current output cable 320 that results from combining two conductive lines passes through one hole, the second through-hole 49*b*, and thus the structure is simplified.

On the other hand, according to the embodiment of the present invention, the junction box 200 is realized as the insulating cases 491 and 492. Thus, the junction box 200 does not need to be attached to the frame 105 in order to ground the junction box 200, and, as in the drawings, is possibly disposed on the back surface of the photovoltaic solar cell module 100 so that the junction box 200 is at the predetermined distance Dr away from the frame 105. The frame includes portion 22 having sub-portions 222, 224 and 226, portion 24 having sup-portions 242, 244, 244*c* and 244*d*.

On the other hand, the junction box 200 and the photovoltaic solar cell module 100 are joined to each other using a joining member (not illustrated), but may be combined with each other using a combining member (not illustrated) without being limited to the joining member.

On the other hand, the positioning of an adhesive member (not illustrated) on the bottom surface (for example, the bottom surface 4942 of the first insulating case 491) of the junction box 200 stably holds photovoltaic solar cell module 100 and the junction box 200 (or the junction box 200) in place, thereby ensuring an excellent airtight characteristic, an excellent sealing characteristic, and an excellent watertight characteristic. The first insulating case 491 includes a first holder 49c having portions 490c, 490d and 490c and fasteners 62, and fixer 490h. The first insulating case 491 includes a second holder 49d having portions 490g, 491d, 492d, and fastener 64.

More specifically, the adhesive member (not illustrated), when viewed from above, is formed to be enclosed by the first through-hole 49a in the junction box 200 and thus to have a closed space.

This makes it possible for the ribbon 122 to be disposed within the junction box 200 through the use of the first through-hole 49a formed in the junction box 200, and also plays a role of employing partitioning into a space between the photovoltaic solar cell module 100, which is disposed within the adhesive member (not illustrated), and the junction box 200 and an external space for separation. Accordingly, the junction box 200 that has the first through-hole 49a is sealed.

As described above, the junction box 200 includes the first through-hole 49a and the second through-hole 49b together. Whereas the positioning of the alternating-current output cable 320 in the second through-hole 49b ensures the sealing or airtight characteristic, the first through-hole 49a has to be opened in order for the ribbon 122 to smoothly pass through.

Therefore, unless a separate adhesive member (not illustrated) is formed, foreign materials, moisture, impurities, and the like are introduced into the junction box 200 through the first through-hole 49a.

To solve this problem, according to the present embodiment, the adhesive material (not illustrated) member is formed that encloses a space which is open through the first through-hole 49a. Thus, the inside of the junction box 200 is prevented from communicating with the outside.

Accordingly, the airtight characteristic, the sealing characteristic, and the watertight characteristic of the junction box 200 are improved. In addition, with the adhesive member (not illustrated), the junction box 200 is also fixed to the photovoltaic solar cell module 100, and thus, the stability due to the fixation is improved.

As the adhesive member (not illustrated), various materials that have an excellent adhesive characteristic and an excellent sealing characteristic are used. As one example of the adhesive material (not illustrated), a sealant or the like is used. Various modifications are possible.

The junction box 200 described above includes various insulating materials that maintain their external appearances and external surfaces and that protect various components, articles, members, and the like which are disposed inside of the junction box 200. As one example, if the insulating cases 491 and 492 of the junction box 200 are formed of resin, an insulating characteristic is improved and the cost is saved.

Figure 6:
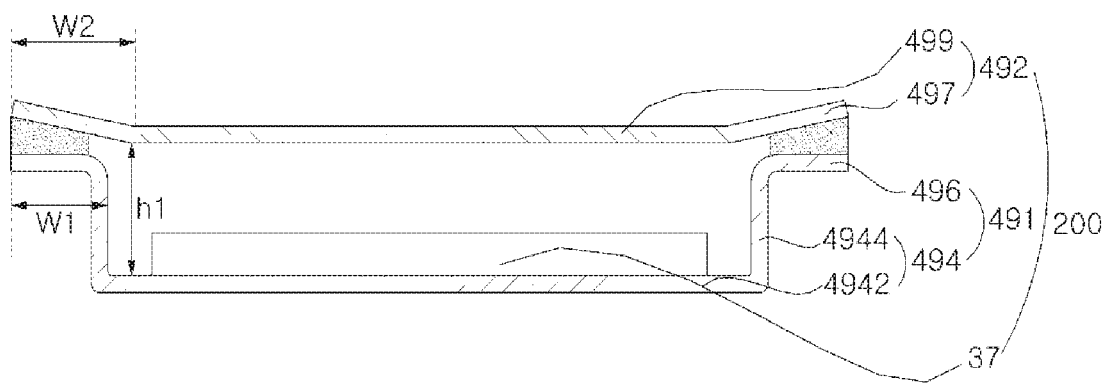
FIG. 6 is an example of a cross-sectional diagram of the junction box in FIG. 5.

On the other hand, with reference to FIG. 6, the junction box 200 includes the first insulating case 491 and the second insulating case 492 that are integrally joined to each other to be formed into one case.

The first insulating case 491 may accommodate the circuit board 37 and the second insulating case 492 may cover the circuit board 37.

Accordingly, the terminal 31, the bypass diode unit 510, the converter 530, and the inverter 540 that are disposed inside of the junction box 200 are easy to take out of the junction box 200 and to put into the junction box 300, in a state where the first insulating case 491 and the second insulating case 492 are separated. Furthermore, the terminal 31, the bypass diode unit 510, the converter 530, the inverter 540 that are disposed inside of the junction box 200 are stably held in place in a state where the first insulating case 491 and the second insulating case 492 are combined.

The first insulating case 491 here includes an internal space portion 494 that includes the bottom surface 4942 and the flank surface 4944 and in which an internal space is disposed, and a joining flange 496 that extends from the upper end of the internal space portion 494, in parallel to or inclined to the bottom surface 4942.

At this time, the flank surface 4944 is formed on all edges of the bottom surface 4942, and the internal space portion 494 is formed in such a manner that only one surface of the internal space is open.

For example, in a case where the bottom surface 4942 is rectangular, four flank surfaces 4944 that extend from four edges, respectively, that constitute the rectangle are provided, that is, the shape of a rectangle of which one surface is not formed is provided. As one example, the internal space portion 494 has a structure in which at least five surfaces are provided and only one surface is open.

In the drawings, the bottom surface 4942 has a shape that has four straight lines and a rounded corner at a point where the adjacent two lines intersect.

For example, the bottom surface 4942 has a shape of approximately a rectangle, but portions of the bottom surface 4942, which correspond to four corners of the rectangle, are rounded. The flank surface 4944 is formed on all edges of the bottom surface 4942, and extends to intersect (for example, to be orthogonal to) the bottom surface 4942.

Accordingly, the flank surface 4944 is formed to include four planes corresponding to four straight lines, respectively, and four rounded curved surfaces that are disposed in four corners, respectively, where the two adjacent planes intersect. Accordingly, the internal space is sufficiently secured, and sharp corners is prevented from hurting the user, and so forth. However, the present invention is not limited to this, and the shapes and the like, of the bottom surface 4942 and the flank surface 4944 may be transformed.

The joining flange 496 is formed into a shape bent from the flank surface 4944 and then extends. The joining flange 496 provides an area to which a joining member 493 is applied, and thus the first insulating case 491 and the second insulating case 492 are joined to each other with the joining member 493.

At this time, the joining flange 496 is bent from the flank surface 4944 and then extends outward. Thus, the internal space of the internal space portion 494 is all open so that the terminal 31, the bypass diode unit 510, the converter 530, and the inverter 540 are easy to mount and remove without being interrupted by the joining flange 496.

The joining flange 496 is to have a surface in parallel to the bottom surface 4942, and/or is to have a surface orthogonal to the flank surface 4944. Then, the joining member 493 is stably applied on the joining flange 496. However, the present invention is not limited to this.

According to the present invention, the joining flange 496 extends from all end portions of the flank surface 4944 and, when viewed from above, is seamlessly formed to enclose the internal space portion 494.

The joining flange 496 here is formed to have a flat surface in such a manner that the joining flange 496 is disposed on the same plane. Then, the first insulating case 491 and the second insulating case 492 are joined in their entireties to each other by the joining flange 496 applied on the joining member 493, and thus the junction box 200 maintains high-level airtight closure.

At this point, the entire width of the joining flange 496 is made uniform, and the joining member 493 is uniformly applied. Thus, the first insulating case 491 and the second insulating case 492 are stably joined to each other. Then, when repair or replacement is necessary, a cutting tool (for example, a knife or the like) is inserted between the joining flange 496 and the second insulating case 492 and is moved in a circle along the joining flange 496. Thus, the joining member 493 is cut off and the first insulating case 491 and the second insulating case 492 are easily separated from each other. That is, the moving of the cutting tool along a flat surface of the joining flange 496 easily separates the first insulating case 491 and the second insulating case 492 from each other.

According to the present embodiment, the second insulating case 492 has an edge shape in which an edge of the second insulating case 492 agrees with an external edge of the joining flange 496 and has a plate shape that covers one open surface of the internal space portion 494.

The second insulating case 492 here includes an internal portion 497 evenly formed to be in parallel to the bottom surface 4942 inside and an external 499 inclined in such a manner that the external portion 499 is moved away from the first insulating case 491 in an outward direction from the internal portion 497. A portion of the external portion 499, which overlaps the joining flange 496, is joined to the joining flange 496 by the joining member 493.

If the external portion 499 is formed to be inclined in the outward direction, a border line (a border portion) that can be visually recognized with user's eyes or can be recognized with a device is formed between the internal portion 497 and the external portion 499. The internal portion 497 is disposed over the joining flange 496 or is disposed not to be out of the joining flange 496, and thus approximate positions of the first insulating case 491 and the second insulating case 492 are adjusted. An area of the internal portion 497 here is smaller than that of the bottom surface 4942. For example, a width W2 of the external portion 499 is formed to be greater than a width W1 of the joining flange 496. Then, the positioning of a border line between the internal portion 497 and the external portion 499 within the joining flange 496 (that is, in the internal space) more easily adjusts the approximate positions of the first insulating case 491 and the second insulating case 492. In this manner, the border line between the internal portion 497 and the external portion 499 is used like a type of guide, an alignment mark, or the like.

Figure 7:
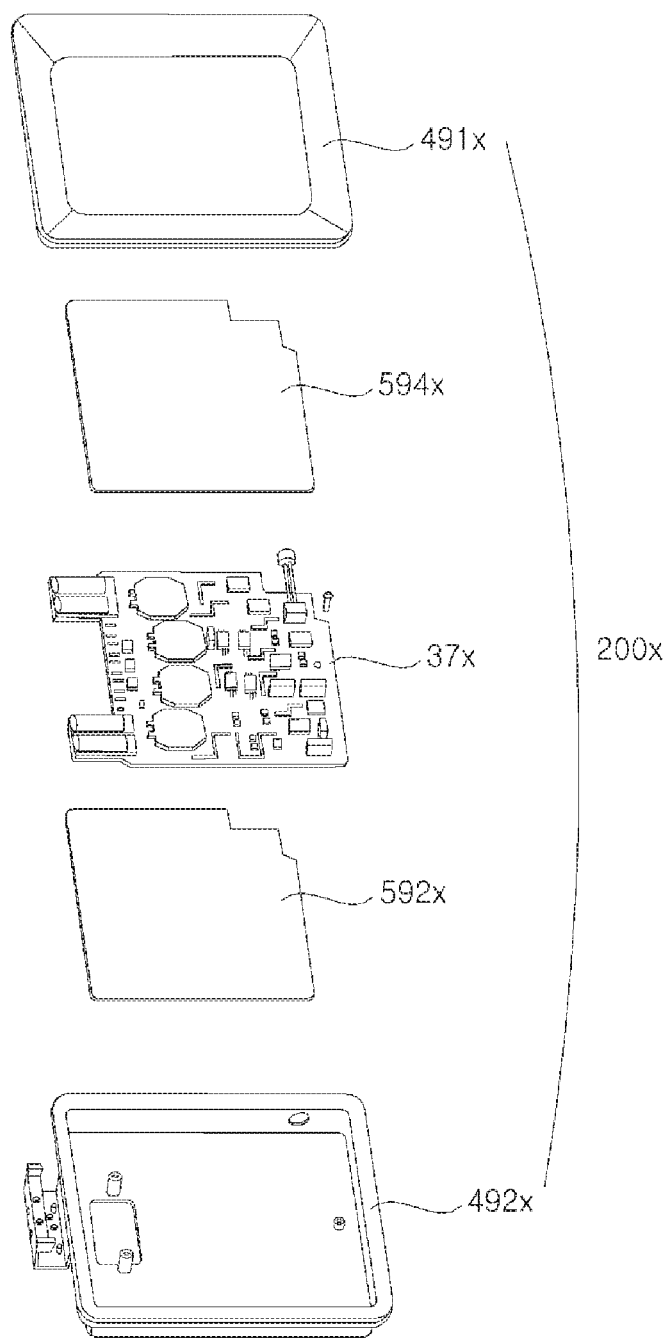
FIG. 7 is an exploded diagram of a junction box of a related art.

Then, when the external portion 499 is inclined in such a manner that the external portion 499 is moved away from the internal portion 497 in the outward direction, as illustrated in FIG. 7, a distance (that is, the thickness of the joining member 493 disposed between the joining flange 496 and the external portion 499) between the joining flange 496 and the external portion 499 is greater at the external edge than at the internal edge. Then, because a distance between the first insulating case 491 and the second insulating case 492 is greater at the external edge portion of the joining flange 496 than at the internal edge portion, the first insulating case 491 and the second insulating case 492 are more easily separated from each other using the cutting tool. That is, the joining flange 496 and the external portion 499 are easily cut by inserting the cutting between them.

The joining member 493 disposed between the joining flange 496 of the first insulating case 491 and the external portion 499 of the second insulating case 492, which overlap, joins the first insulating case 491 and the second insulating case 492 to each other for sealing. Thus, impurities, contaminants, and the like are prevented from being introduced from the outside, and the sealing characteristic and the watertight characteristic are improved. As the joining member 493, various materials that have joining and/or sealing characteristics are used. For example, a sealant or the like are used.

However, the present invention is not limited to this, and it is also possible that the junction box 200 is formed without enclosing the entire internal space. In addition, various modifications are possible such as when the flank surface is formed only on one portion of the first insulating case 491 or is not formed, and when the frank surface is formed on at least one portion of the second insulating case 492. In addition, various other modifications are possible such as when the junction box 200 possibly includes three or more portions that are combined with each other.

In this manner, if the first insulating case 491 and the second insulating case 492 are provided together, components and the like that are disposed inside of the junction box 200 are easy to take out of the junction box 200 and to put into the junction box 200. Furthermore, the joining of the first insulating case 491 and the second insulating case 492 with the joining member 493 stably seals the junction box 300. Thus, a problem that will occur due to external moisture and the like is prevented, and components that are disposed inside are stably protected against external physical shock. However, the present invention is not limited to this, and it is also possible that the junction box 200 includes at least one of the first insulating case 491 and the second insulating case 492. For example, various modifications are possible such as when the photovoltaic solar cell module 100 plays a role of the second insulating case 492 by bringing the joining flange 496 of the first insulating case 491 into contact with the photovoltaic solar cell module 100 without the second insulating case 492 being formed.

On the other hand, the circuit board 37 is contacted with at least one of the first insulating case 491 and the second insulating case 492.

FIG. 6 is an example of a cross-sectional diagram of the junction box 200. With reference to FIG. 6, the circuit board 37 is disposed between the first insulating case 491 and the second insulating case 492 that are joined to each other.

Particularly, the circuit board 37 is contacted with the first insulating case 491 and thus is disposed on the first insulating case 491 disposed on the photovoltaic solar cell module 100.

On the other hand, the first insulating case 491 and the second insulating case 492 are possibly realized using non-metal plastic resin or the like and thus are insulated in themselves from the circuit board 37. Therefore, as in the drawings, the circuit board 37 is contacted with the first insulating case 491, and thus is disposed on the first insulating case 491.

Accordingly, a separate space does not need to be provided between the first insulating case 491 and the circuit board 37, and thus a thickness h1 is reduced. Therefore, there is an advantage in that the size of the junction box 200 is compactly realized.

On the other hand, the first insulating case 491 and the second insulating case 492 are possibly realized using non-metal plastic resin or the like. Thus, there is an advantage in that a separate insulating member does not need to be provided between the circuit board 37 and the first insulating case 491 or the second insulating case 492. Therefore, the thickness h1 of the junction box 200 is reduced and the size of the junction box 200 is compactly realized.

FIG. 6B is another example of the cross-sectional diagram of the junction box 200. FIG. 6B is similar to FIG. 6, but is different from FIG. 6 in that an insulating member ISI for insulation is further disposed, for insulation, between the first insulating case 491 and the circuit board 37.

In the drawings, it is illustrated that the circuit board 37 has a front surface FF and a back surface BF and that the insulating member ISI is contacted with the back surface (BF). The circuit board 37 also includes a first element 354 and a second element 356.

On the other hand, an insulating member is further disposed on the first insulating case 491 and the circuit board 37, and thus circuit elements within the circuit board 37 are further protected.

On the other hand, as in FIG. 6B, a size of the insulating member ISI is preferably greater than a size of the circuit board 37. In order to insulate the entire circuit board 37, the size of the insulating member ISI is preferably greater than the size of the circuit board 37.

On the other hand, FIG. 6C is another example of the cross-sectional diagram of the junction box 200. FIG. 6C is similar to FIG. 6, but is different from FIG. 6 in that a coating layer POT is formed on the back surface BF of the circuit board 37.

The coating layer POT is for insulating the back surface BF of the circuit board 37, and is formed as an insulating layer or is formed of a potting material.

In this manner, with the coating layer POT formed on the back surface BF of the circuit board 37, the circuit elements within the circuit board 37 are further protected.

FIG. 7 is an exploded diagram of a junction box in the related art.

With reference to the drawings, a junction box 200x in the related art includes a first metal case 491x and a second metal case 492x that are integrally joined to each other to be formed into one case, a circuit board 37x, a first insulating member 592x between the first metal case 491x and the circuit board 37x, and a second insulating member 594x between the second metal case 492x and the circuit board 37x.

In order to ground the junction box or for other reasons, the first metal case 491x and the second metal case 492x forms the exterior appearance of the junction box 200x in the related art.

However, in a case where the first metal case 491x and the second metal case 492x are used, electromagnetic interference between the circuit board 37x and the first metal case 491x or the second metal case 492x is problematic.

Accordingly, as in FIG. 7, the first insulating member 592x has to be further disposed between the first metal case 491x and the circuit board 37x, and the second insulating member 594x has to be further disposed between the second metal case 492x and the circuit board 37x.

With this structure, the first insulating member 592x and the second insulating member 594x are additionally needed, and the circuit board 37x has to be at a sufficient distance away from the first metal case 491x or the second metal case 492x. Thus, there is a disadvantage in that the thickness of the junction box 200x is increased.

Furthermore, there is a disadvantage in that the increase in the thickness of the junction box 200x increases the thickness of a frame disposed on the back surface of the junction box 200x in order to prevent the junction box 200x from protruding from the back surface of the photovoltaic module.

Accordingly, according to the present invention, an insulating case made of a plastic material, instead of a metal material, is used as a case of the junction box.

As illustrated in FIG. 2, the junction box 200 according to the embodiment of the present invention includes the first insulating case 491 and the second insulating case 492 that are integrally joined to each other to be formed into one case, and the circuit board 37.

Specifically, the junction box 200 includes the first insulating case 491 disposed on the back surface of the photovoltaic solar cell module 100, the circuit board 37 disposed on the first insulating case 491 and on which the converter 530 that converts the level of the DC power from the photovoltaic solar cell module 100 and the inverter 540 that converts the DC power from the converter 530 into an AC power are mounted, and the second insulating case 492 joined to the first insulating case 491 and is disposed on the circuit board 37.

Particularly, an insulating member is not disposed between the first insulating case 491 and the circuit board 37 or between the second insulating case 492 and the circuit board 37.

Accordingly, the insulating members 592x and 594x are dispensed with, and thus the size of the junction box 200 is compactly realized. Particularly, the thickness of the junction box 200 is reduced.

Figure 8:
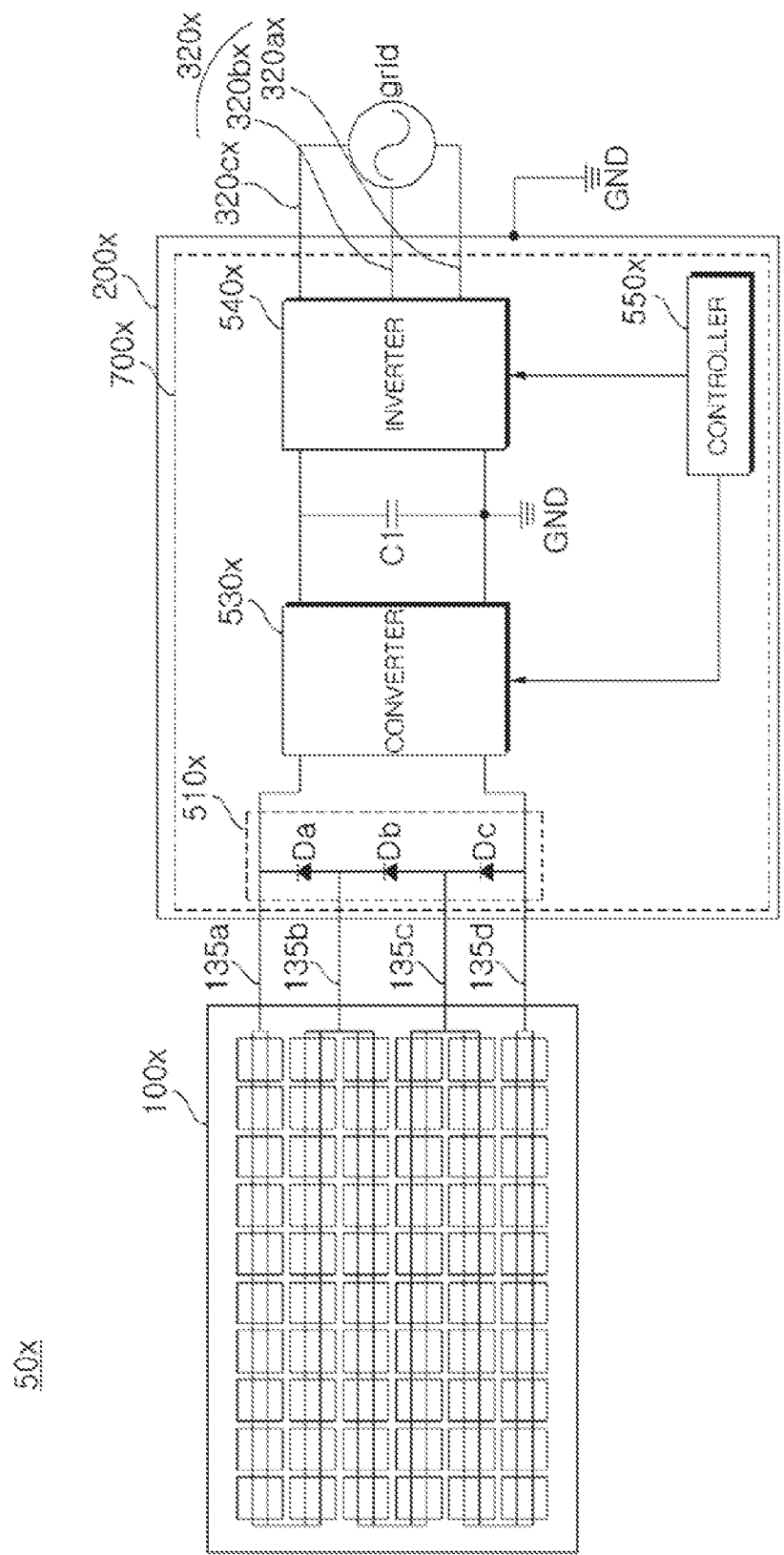
FIG. 8 is an example of a block diagram of the inside of the junction box in FIG. 7.

FIG. 8 is an example of a block diagram of the inside of the junction box in FIG. 7.

With reference to the drawings, shown is a photovoltaic module 50x, and a photovoltaic solar cell module 100x, where the junction box 200x in the related art has an electric power conversion module 700x inside, and particularly includes a bypass diode unit 510x, a converter 530x, a capacitor C1x, an inverter 540x, and a controller 550x.

With reference to the drawings, an AC power is output over a cable 320x electrically connected to the inverter 540x. The cable 320x here includes first and second conductive lines 320bx and 320cx and a grounding line 320ax.

Accordingly, unlike in FIG. 2, the grounding line 320ax is further included within the cable 320x. Thus, there is a disadvantage in that the cable 320x is not configured in a compact manner.

In addition, there is a disadvantage in that a separate ground GND is separately provided in order to ground the converter 530x and the inverter 540x within the junction box 200x.

Figure 9:
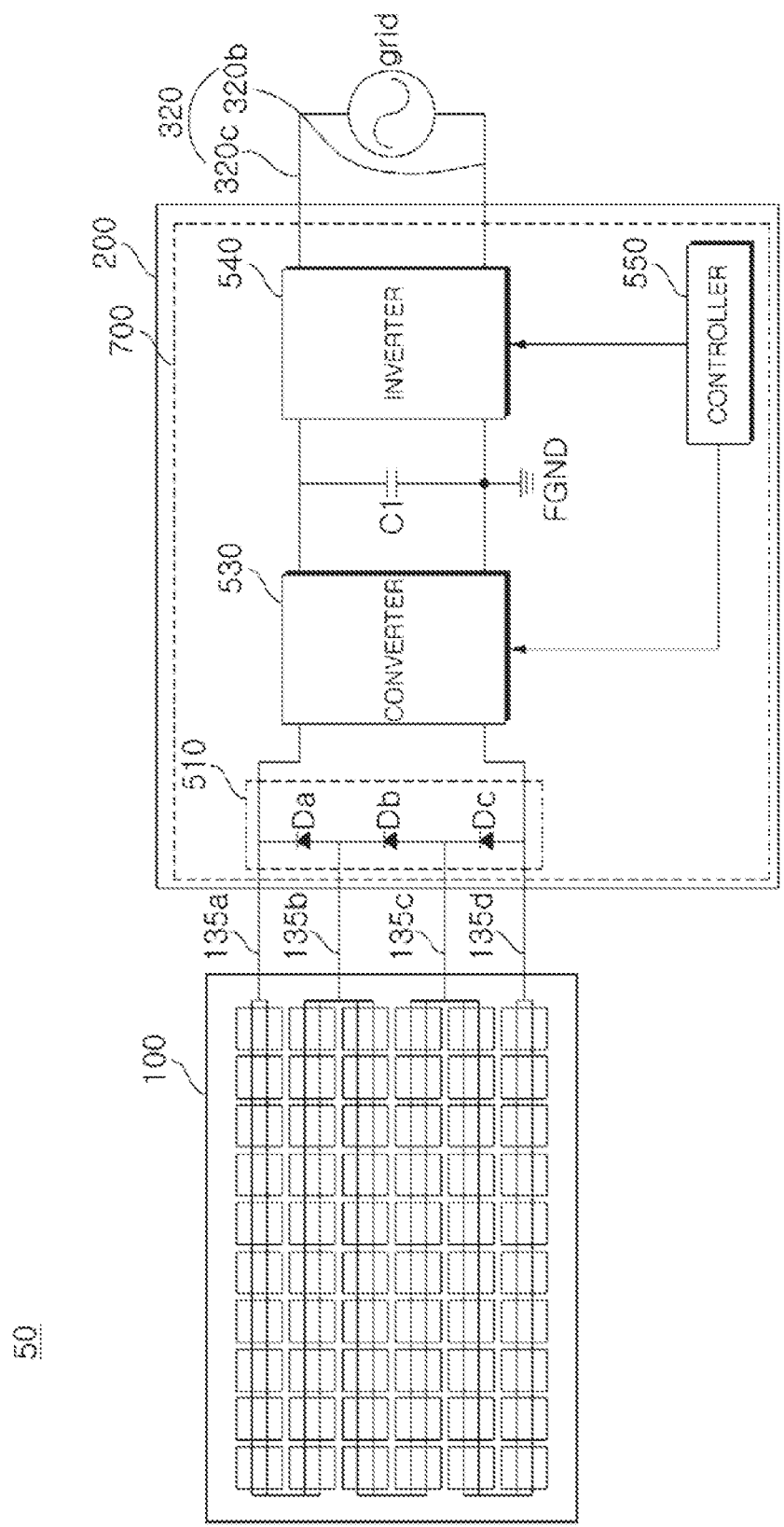
FIG. 9 is an example of a block diagram of the inside of the junction box in FIG. 2.

FIG. 9 is an example of a block diagram of the inside of the junction box in FIG. 2.

With reference to the drawings, an electric power conversion module 700 within the junction box 200 includes the bypass diode unit 510, the converter 530, the capacitor C1, the inverter 540, and the controller 550.

The bypass diode unit 510 includes diodes Dc, Db, and Da that are arranged between third and fourth conductive lines 135c and 135d, second and third conductive lines 135b and 135c, and first and second conductive lines 135a and 135b, respectively. The number of bypass diodes here is equal to or greater than 1, and is preferably smaller by 1 than the number of conductive lines.

The bypass diodes Dc, Db, and Da receive DC powers from the first to fourth conductive lines 135a, 135b, 135c, and 135*d*. Then, in a case where a reverse voltage occurs in the DC power from at least one among the first to fourth conductive lines 135*a*, 135*b*, 135*c*, and 135*d*, the bypass diodes Dc, Db, and Da bypass the reverse voltage.

On the other hand, an input power Vpn that passes through the bypass diode unit 510 is input into the converter 530.

The converter 530 converts a level of the input power Vpv output from the bypass diode unit 510, and outputs a DC power that results from the level conversion.

Accordingly, the DC power that results from the level conversion is stored in the capacitor C1.

On the other hand, both terminals of the dc-terminal capacitor C1 are dc terminals, and the capacitor C1 is also referred to as a dc-terminal capacitor.

The inverter 540 converts the DC power, which is stored in the dc-terminal capacitor C1, into an AC power.

With reference to the drawings, an AC power is output over the cable 320 electrically connected to the inverter 540. The cable 320 here includes the first and second conductive lines 320*bx* and 320*cx*, and does not include a grounding line 320*a*.

Accordingly, unlike in FIG. 8, the grounding line 320*a* is not included within the cable 320. Thus, there is an advantage in that the cable 320 is configured in a compact manner.

On the other hand, in order to ground the converter 530 and the inverter 540 within the junction box 200, the floating ground FGND formed on the circuit board 37 is used without separately providing a separate ground GND. Accordingly, the grounding of the converter 530 and the inverter 540 are simply realized.

Figure 10A:
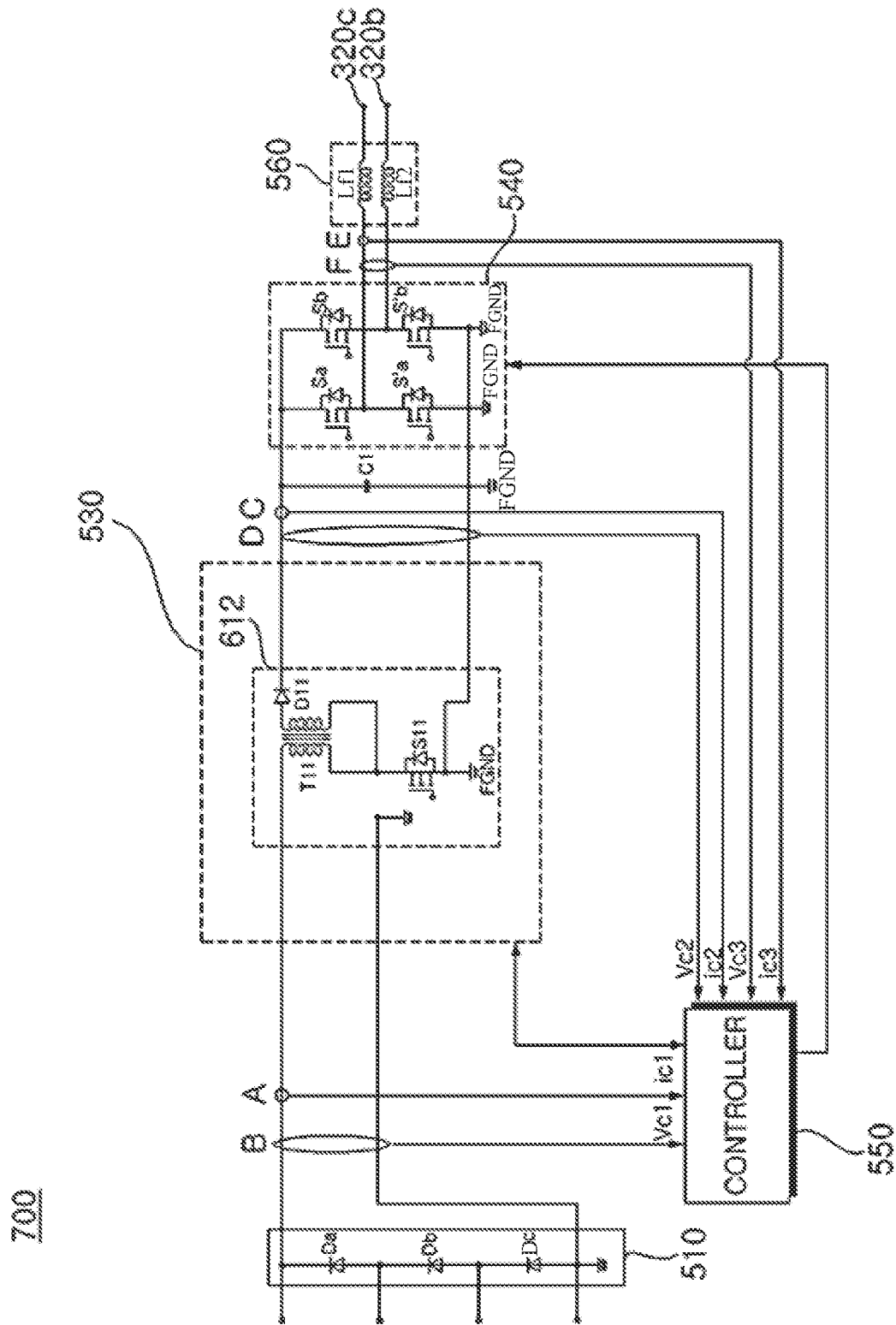
FIG. 10A is an example of a diagram of an circuit within the junction box in FIG. 9.

FIG. 10A is an example of a diagram of a circuit within the junction box in FIG. 9. FIG. 10A illustrates a tap inductor converter as the converter 530.

The converter 530 performs electric power conversion using a DC power Vpv output from the bypass diode unit 510.

A tap inductor converter 612 includes a tap inductor T11, a switching element S11 connected between the tap inductor T11 and a grounding terminal, and a diode D11 connected to an output terminal of the tap inductor and allows the flow of current in one direction only. On the other hand, the dc-terminal capacitor C1 is connected between an output terminal, that is, a cathode, of the diode D11, and the grounding terminal.

Specifically, the switching element S11 is connected between a tap of a tap inductor T11 and the grounding terminal. Then, an output terminal (the second side) of the tap inductor T11 is connected to an anode of the diode D11, and the dc-terminal capacitor C1 is connected between the cathode of the diode D1 and the grounding terminal.

On the other hand, the first side and the second side of the tap inductor T11 are opposite in polarity. On the other hand, the tap inductor T11 is also referred to as a switching transformer.

On the other hand, in the drawings, the first side and the second side of the tap inductor T11 are connected to each other. Accordingly, the tap inductor converter is a non-insulating converter.

On the other hand, the inverter 540 converts the DC power that results from the level conversion in the converter 530, into an AC power. In the drawing, a full-bridge inverter is illustrated. That is, upper-arm switching elements Sa and Sb that are connected in series to each other and lower-arm switching elements S'a and S'b that are connected in series to each other constitute a pair, and two pairs of upper-arm switching elements Sa and Sb and lower-arm switching elements S'a and S'b in total are connected in parallel to each other (Sa and S'a, and Sb and S'b). The diodes are connected in an antiparallel manner to each of the switching elements Sa, S'a, Sb, and S'b.

The switching elements within the inverter 540 perform turning-on and turning-off operations based on an inverter switching control signal from the controller 550. Accordingly, an AC power that has a predetermined frequency is output. The AC power preferably has the same frequency (approximately 60 Hz or 50 Hz) as an AC frequency of the grid.

A first filter unit 560 is disposed to be connected to an output terminal of the inverter 540, and performs low pass filtering in order to smooth an AC power output from the inverter 540. To that end, in the drawings, inductors Lf1 and Lf2 are illustrated, but various examples of this are available.

Accordingly, electromagnetic interference (EMI) that occurs in the inverter 540 is reduced. Furthermore, electromagnetic interference that occurs in the circuit board 37 is reduced.

On the other hand, a converter input electric-current detection unit A detects an input electric current ic1 input into the converter 530, and a converter input voltage detection unit B detects an input voltage vc1 input into the converter 530. The input electric current ic1 and the input voltage vc1 that are detected are input into the controller 550.

On the other hand, a converter output electric-current detection unit C detects an output electric current ic2, that is, a dc-terminal electric current, output from the converter 530, and a converter output voltage detection unit D detects an output voltage vc2, that is, a dc-terminal voltage, output from the converter 530. The output electric current ic2 and the output voltage vc2 that are detected are input into the controller 550.

On the other hand, an inverter output electric-current detection unit E detects an output electric current ic3 output from the inverter 540, and an inverter output voltage detection unit F detects an output voltage vc3 output from the inverter 540. The electric current ic3 and the voltage vc3 that are detected are input into the controller 550.

On the other hand, the controller 550 outputs a control signal that controls the switching element S1 of the converter 530 in FIG. 10. Particularly, based on at least one among the input electric current ic1, the input voltage vc1, the output electric current ic2, the output voltage vc2, the output electric current ic3, and the output voltage vc3, which are detected, the controller 550 outputs a timing signal that turns on the switching element S1 within the converter 530.

On the other hand, the controller 550 may output an inverter control signal that controls each of the switching elements Sa, S'a, Sb, and S'b of the inverter 540. Particularly, based on at least one among the input electric current ic1, the input voltage vc1, the output electric current ic2, the output voltage vc2, the output electric current ic3, and the output voltage vc3, the controller 550 outputs a timing signal that turns on each of the switching elements Sa, S'a, Sb, and S'b of the inverter 540.

On the other hand, the controller 550 computes a maximum electric power point for the photovoltaic solar cell module 100 and accordingly controls the converter 530 in such a manner that a DC power which corresponds to a maximum electric power is output.

On the other hand, in order to ground the converter 530 and the inverter 540, as described above, the floating ground FGND formed on the circuit board 37 is used. Accordingly, the grounding of the converter 530 and the inverter 540 are simply realized.

Figure 10B:
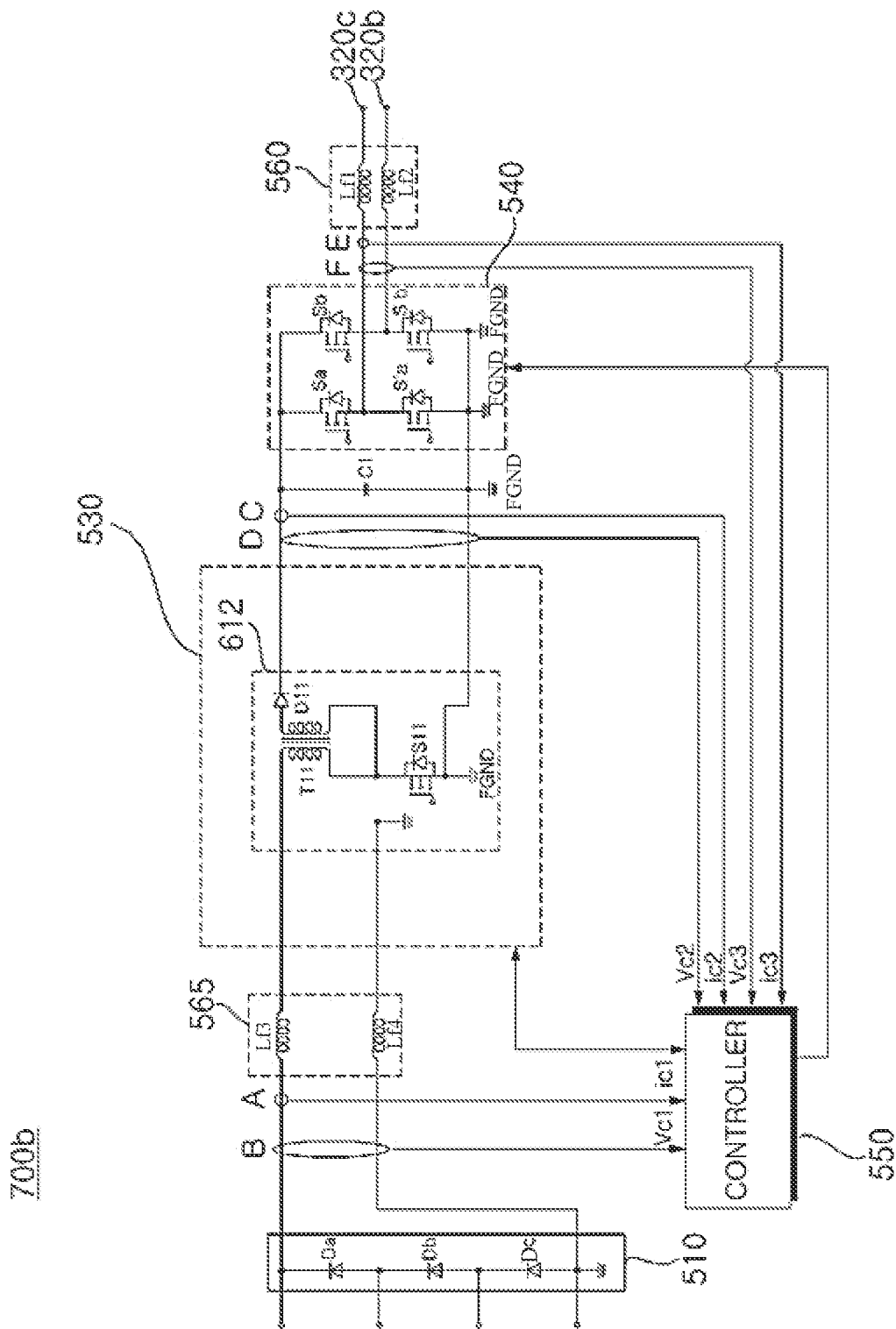
FIG. 10B is another example of the diagram of the circuit within the junction box in FIG. 9.

FIG. 10B is another example of the diagram of the circuit within the electric power conversion module in FIG. 9.

In the same manner as the electric power conversion module 700 in FIG. 10A, an electric power conversion module 700b in FIG. 10B includes the bypass diode unit 510, the converter 530 including the tap inductor converter 612, the dc-terminal capacitor C1, the inverter 540, the controller 550, and the first filter unit 560.

However, a difference is that the electric power conversion module 700b in FIG. 10B, unlike the electric power conversion module 700 in FIG. 10A, further includes a second filter unit 565 for reducing interference, which is connected to an input terminal of the converter 530.

Accordingly, the second filter unit 565 on the input side and the first filter unit 560 on the output side each are disposed on the circuit board 37, and the electromagnetic interference (EMI) that occurs in the circuit board 37 is further reduced.

Figure 11:
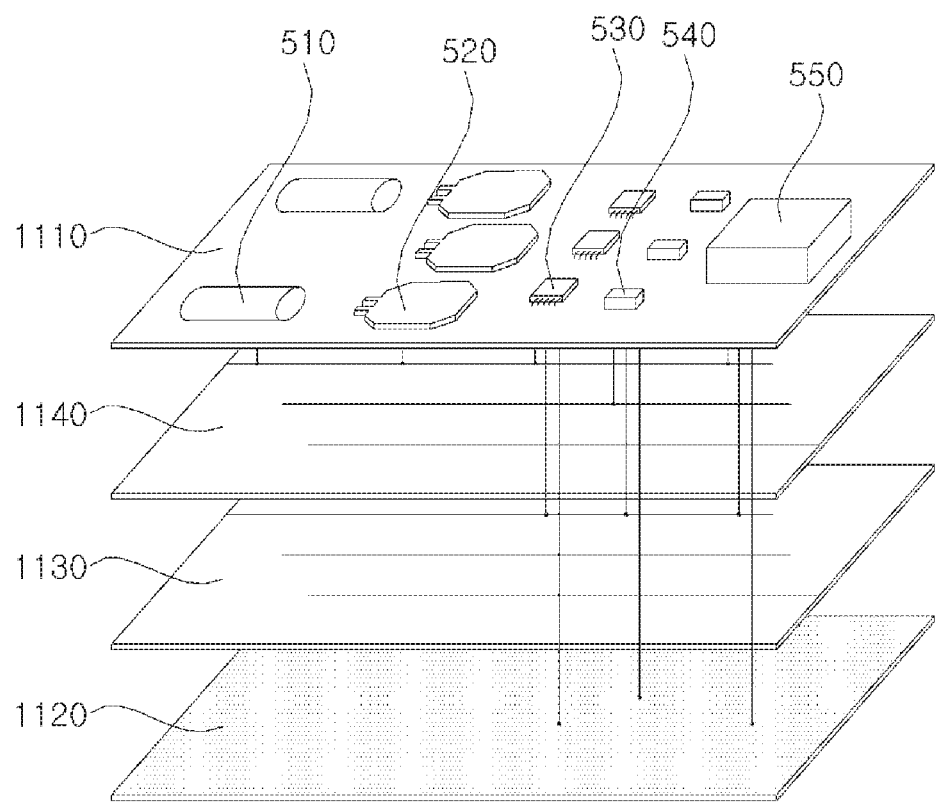
FIG. 11 is an exploded diagram of a circuit board in FIG. 2.

FIG. 11 is an exploded diagram of the circuit board in FIG. 2.

With reference to the drawings, the circuit board 37 according to the embodiment of the present invention includes a plurality of conductive layers, conductive layers 1110 to 1140, that are separated from each other. On the other hand, an insulating layer is formed between each of the plurality of conductive layers, the conductive layers 1110 to 1140.

In the drawings, it is illustrated that, among the plurality of conductive layers, the conductive layers 1110 to 1140, the uppermost conductive layer is the first conductive layer 1110, the lowermost conductive layer is the second conductive layer 1120, the third conductive layer 1130 is on the second conduction layer 1120, and the fourth conductive lay 1140 is on the third conductive layer 1130.

A plurality of circuit elements are mounted on the first conductive layer 1110. For example, arranged on the first conductive layer 1110 described above are bypass diodes within the bypass diode unit 510, the capacitor C1, circuit elements within the converter 530, circuit elements within the inverter 540, the controller 550, circuit elements within the first filter unit 560, circuit elements within the second filter unit 565, circuit elements within the input electric-current detection unit A, circuit elements within the input voltage detection unit B, circuit elements within the converter output electric-current detection unit C, circuit elements within the converter output voltage detection unit D, and the like.

On the other hand, each of the circuit elements is mounted on the first conductive layer 1110 using a method such as soldering or joining.

On the other hand, the floating ground FGND is formed on the second conductive layer 1120, and the converter 530 and the inverter 540 are electrically connected to the floating ground FGND formed on the second conductive layer 1120.

To that end, one portion of each of the converter 530 and the inverter 540 that are mounted on the first conductive layer 1110 is electrically connected to the second conductive layer 1120 through a conduction portion between the first conductive layer 1110 and the second conductive layer 1120.

On the other hand, the control signal from the controller 550 flows through the third conductive layer 1130.

For example, with the control signal from the controller 550, each of the converter 530 and the inverter 540 performs a switching operation.

To that end, one portion of each of the converter 530 and the inverter 540 that are mounted on the first conductive layer 1110 is electrically connected to the third conductive layer 1130 through a conduction portion between the first conductive layer 1110 and the third conductive layer 1130.

On the other hand, a DC power or an AC power flows through the fourth conductive layer 1140.

For example, the electric current power from the photovoltaic solar cell module 100, the DC power of the capacitor C1, the DC power from the converter 530, or the AC power from the inverter 540 flows through the fourth conductive layer 1140.

On the other hand, the cable 320 described above is electrically connected to a DC power line portion formed on the fourth conductive layer 1140.

To that end, one portion of each of the bypass diode unit 510, the capacitor C1, the converter 530, and the inverter 540, which are mounted on the first conductive layer 1110, is electrically connected to the fourth conductive layer 1140 through a conductive portion between the first conduction layer 1110 and the fourth conductive layer 1140.

On the other hand, among the plurality of conductive layers, the conductive layers 1110 to 1140, a conductive area of the second conductive layer 1120 on which the flowing ground FGND is formed is preferably greater than conductive areas of the other conductive layers.

In the drawings, it is illustrated that, among the plurality of conductive layers, the conductive layers 1110 to 1140, a conductive line is formed on each of the third and fourth conductive layers, conductive layers 1130 and 1140 and that the entire second conductive layer 1120 is all formed of a conductive member without a separate conductive line being formed on the second conductive layer 1120.

In this manner, if among the plurality of conductive layers, the conductive layers 1110 to 1140, the conductive area of the second conductive layer 1120, on which the floating ground FGND is formed, is formed to be greater than the conductive areas of the other conductive layers, the electromagnetic interference (EMI) that occurs in the circuit board 37 is reduced.

On the other hand, the second conductive layer 1120 within the circuit board 37, as in FIG. 6, is possibly brought into contact with the second insulating case 492. Accordingly, the thickness of the junction box 200 is reduced, and, therefore, the junction box 200 is compactly realized.

Figure 12:
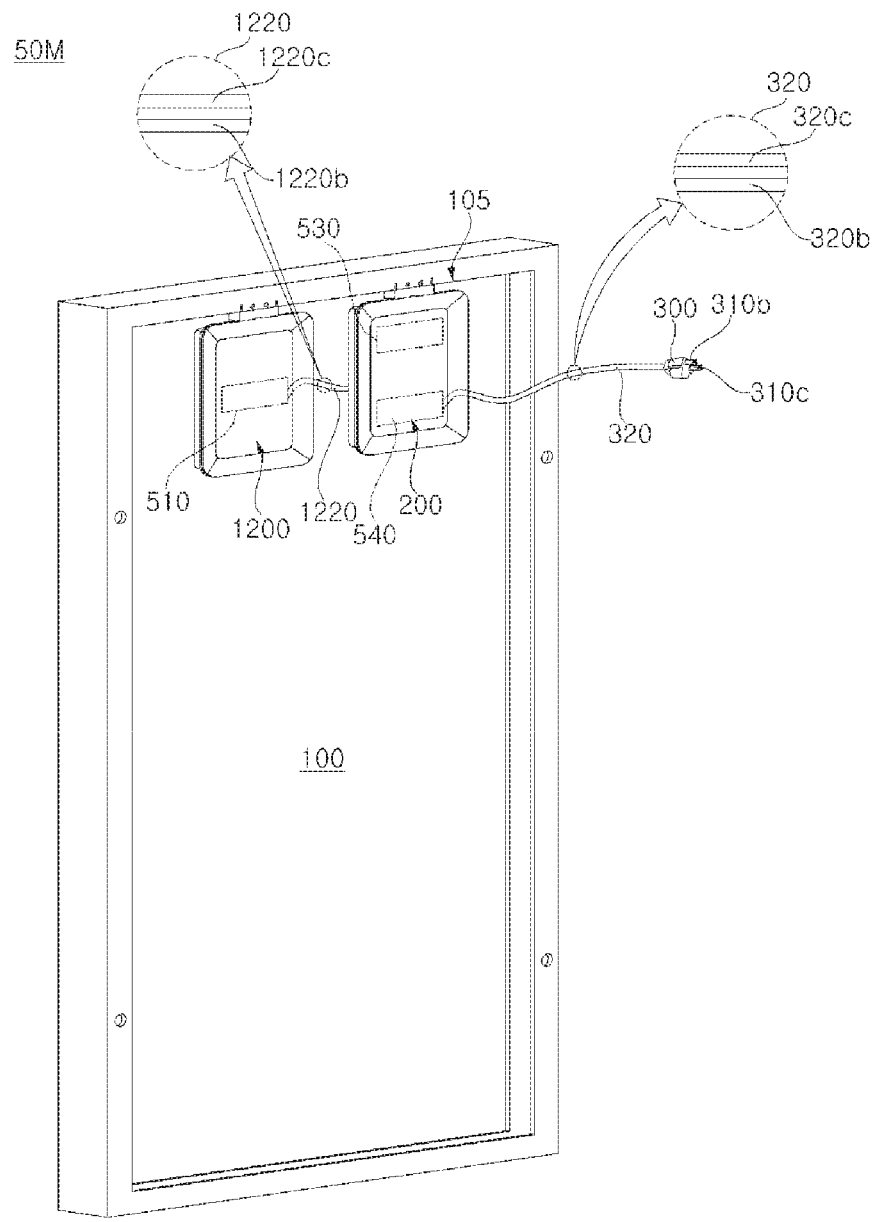
FIG. 12 is a back-view diagram of a photovoltaic module according to another embodiment of the present invention.

FIG. 12 is a back-side diagram of a photovoltaic module according to another embodiment of the present invention.

With reference to the drawings, a photovoltaic module 50M according to another embodiment of the present invention includes the photovoltaic solar cell module 100, a first junction box 1200 disposed on the back surface of the photovoltaic solar cell module 100 and that includes a bypass diode for bypassing a DC power from the photovoltaic solar cell module 100, and a second junction box 200 separated from the first junction box 1200 and that converts a DC power from the first junction box 1200 and outputs a DC power which results from the conversion.

In comparison with FIG. 2, a difference is that the first junction box 1200 is further included.

The first junction box 1200 includes the bypass diode unit 510 that includes a bypass diode, and outputs a DC power.

Similarly to the junction box 200 in FIG. 2, the first junction box 1200 includes an insulating case. A circuit board that includes the bypass diode unit 510 is disposed within the insulating case, and element 520.

Accordingly, the first junction box 1200 is configured with an insulating case, and, therefore, a separate insulating member does not need to be disposed within the first junction box 1200. Thus, a size of the first junction box 1200 is compactly realized. Particularly, the thickness of the first junction box 1200 is reduced.

The second junction box 200 includes the converter 530, the capacitor C1, the inverter 540, the controller 550, the first filter unit 560, the second filter unit 565, and the like.

On the other hand, a DC power cable 1220 is disposed between the first junction box 1200 and the second junction box 200, and the DC power cable 1220 includes two conductive lines, conductive lines 1220b and 1220c, without a grounding line. Accordingly, the DC power is transmitted to the second junction box 200.

On the other hand, specifically, the second junction box 200 includes the first insulating case 491 disposed on the back surface of the photovoltaic solar cell module 100, the circuit board 37 disposed on the first insulating case 491 and on which the converter 530 that converts the level of the DC power from the photovoltaic solar cell module 100 and the inverter 540 that converts the DC power from the converter 530 into an AC power are mounted, and the second insulating case 492 joined to the first insulating case 491 and is disposed on the circuit board 37.

The AC power the cable 320, as described above, includes the first and second conductive lines 320b and 320c, and preferably does not include the grounding line.

On the other hand, the photovoltaic module 50M in FIG. 12, as in FIG. 1, further includes the plug 300 for supplying the AC power from the cable 320 to the external outlet 350. The plug 300 here includes the first and second protrusion portions 310b and 310c corresponding to the first and second conductive lines 320b and 320c, respectively.

On the other hand, the photovoltaic module 50M in FIG. 12, as in FIG. 4, further includes an interface unit 342a that receives input of the AC power from the photovoltaic module 50 and the AC power from the cable 320 and outputs the AC powers to the outside, and a second cable 330 that outputs the AC power from the interface unit 342a to the outside.

The second cable 330 here includes the third and fourth conductive lines 330bb and 330cb and preferably does not include the grounding line.

On the other hand, the circuit board 37 within the second junction box 200 includes the plurality of conductive layers, the conductive layers 1110 to 1140 that are separated from each other. Among the plurality of conductive layers, the conductive layers 1110 to 1140, the converter 530 and the inverter 540 are connected to the first conductive layer 1110. The converter 530 and the inverter 540 are electrically connected to the floating ground FGND formed on the second conductive layer 1120 which is separated from the first conductive layer 1110.

On the other hand, the second junction box 200 includes the first insulating case 491, the circuit board 37, and the second insulating case 492. A separate insulating member does not need to be disposed within the junction box 200, and thus a size of the second junction box 200 is compactly realized. Particularly, the thickness of the second junction box 200 is reduced.

Additional description of the second junction box 200, which is provided above with reference to FIGS. 2 to 11, is omitted.

Figure 13:
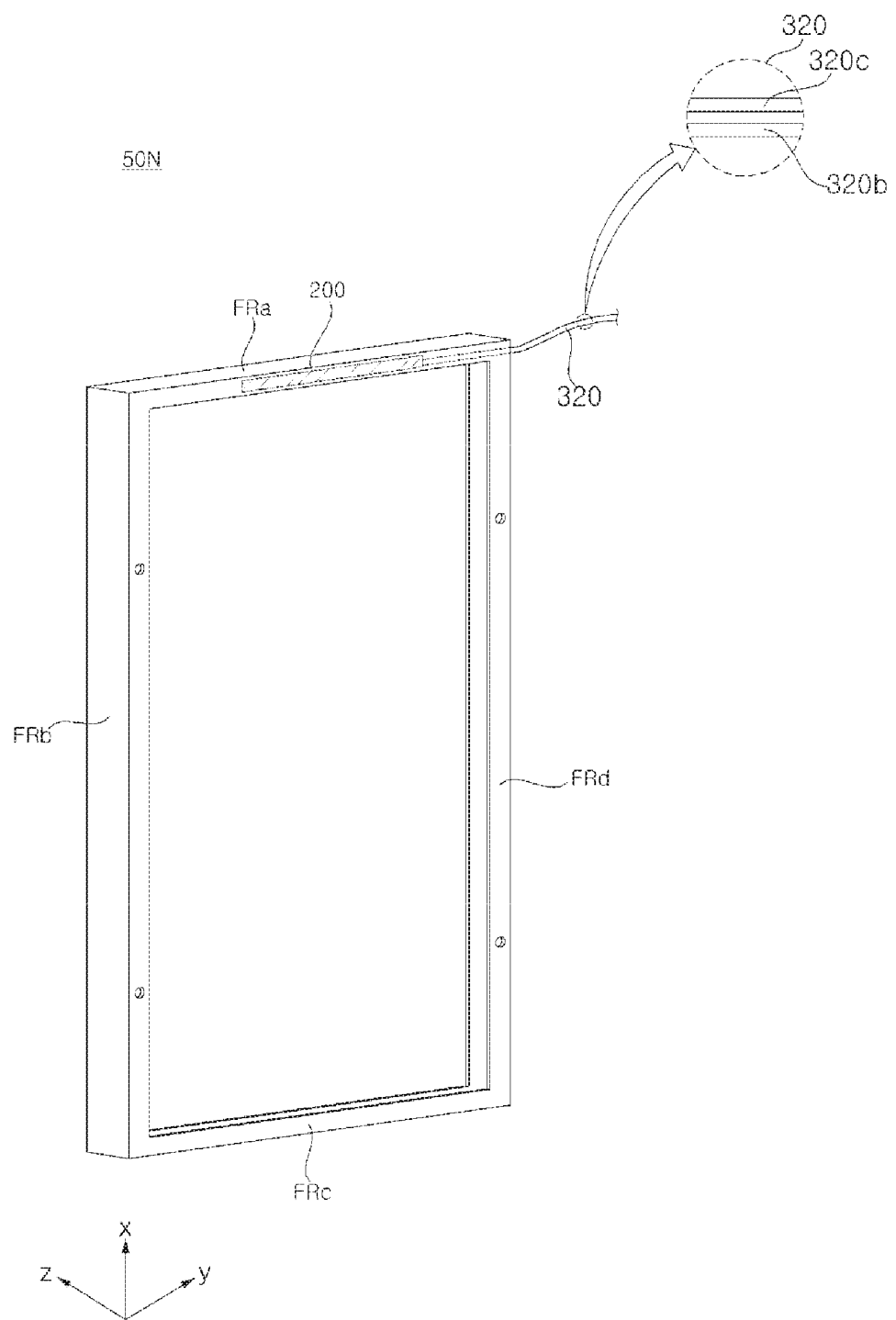
FIG. 13 is a back-view diagram of a photovoltaic module according to still another embodiment of the present invention.

FIG. 13 is a diagram illustrating the back surface of a photovoltaic module according to still another embodiment of the present invention.

With referring to the drawings, a photovoltaic module 50N according to still another embodiment of the present invention includes a frame FR fixed to a peripheral edge portion of the photovoltaic solar cell module 100, and the junction box 200 disposed on an upper-side back-surface frame FRa of a back-surface frame FR disposed on the back surface of the photovoltaic solar cell module 100 and that converts the electric current power from the photovoltaic solar cell module 100 and outputs a DC power that results from the conversion. T back-surface frame FR also includes a lower-side back-surface frame FRc, a left-side back-surface frame FRb, and a right-side back-surface frame FRd.

In comparison with FIG. 2, a difference is that in the photovoltaic module 50N, the junction box 200 is disposed within the upper-side back-surface frame FRa.

On the other hand, the second junction box 200 disposed within the upper-side back-side frame FRa includes the first insulating case 491 disposed on the back surface of the photovoltaic solar cell module 100, the circuit board 37 disposed on the first insulating case 491 and on which the converter 530 that converts the level of the DC power from the photovoltaic solar cell module 100 and the inverter 540 that converts the DC power from the converter 530 into an AC power are mounted, and the second insulating case 492 joined to the first insulating case 491 and is disposed on the circuit board 37. Accordingly, a separate insulating member does not need to be arranged within the junction box 200, and thus, the size of the junction box 200 is compactly realized. Particularly, the thickness of the junction box 200 is reduced.

On the other hand, the cable 320 includes the first and second conductive lines 320b and 320c for outputting the AC power output from the circuit board 37, to the outside, but preferably does not include a grounding line.

On the other hand, the circuit board 37 within the junction box 200 includes the plurality of conductive layers, the conductive layers 1110 to 1140, that are separated from each other. Among the plurality of conductive layers, the conductive layers 1110 to 1140, the converter 530 and the inverter 540 are connected to the first conductive layer 1110. The converter 530 and the inverter 540 are electrically connected to the floating ground FGND formed on the second conductive layer 1120 separated from the first conductive layer 1110.

Additional description of the second junction box 200, which is provided above with reference to FIGS. 2 to 11, is omitted.

Figure 14:
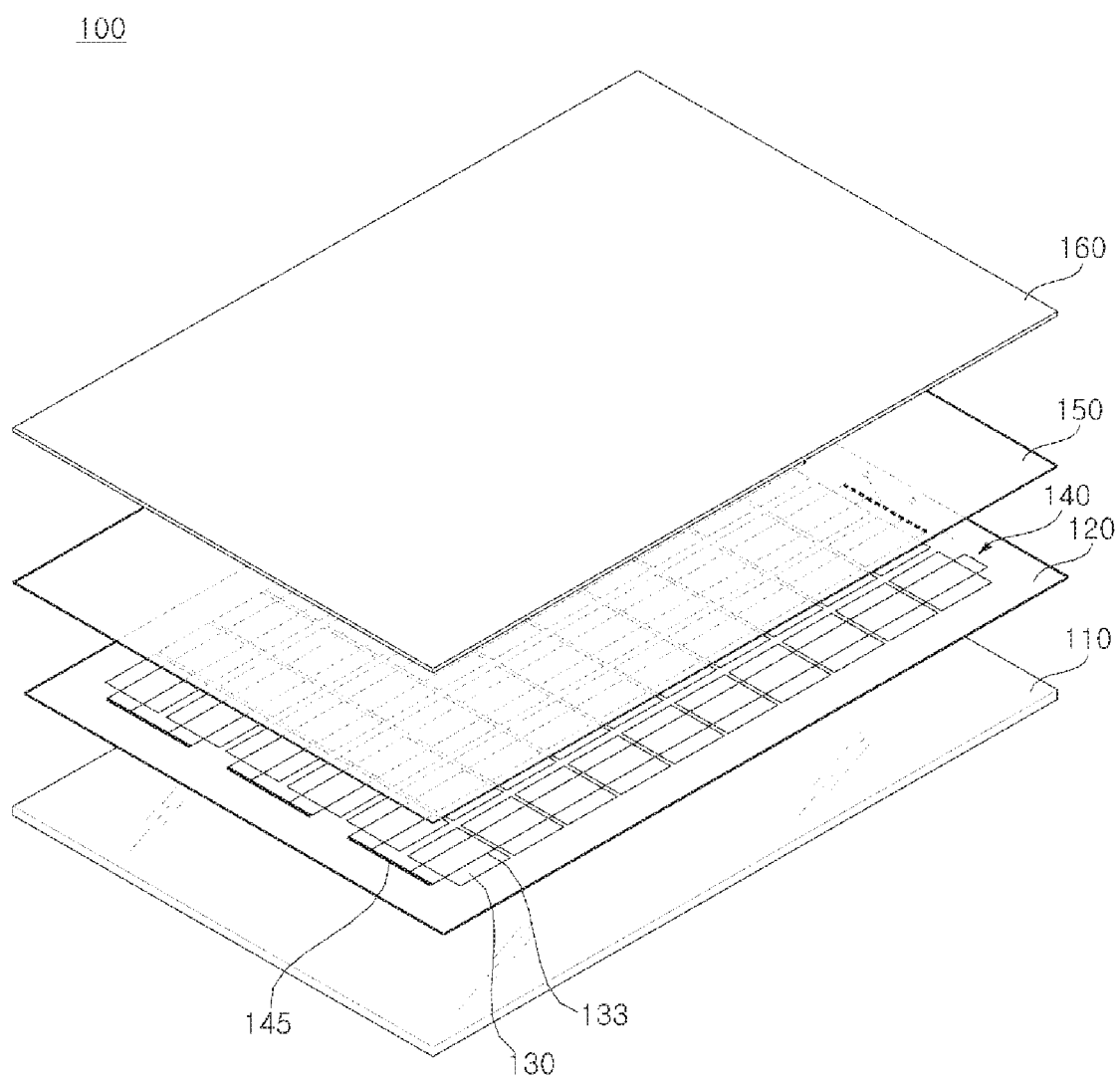
FIG. 14 is a perspective exploded diagram of a photovoltaic solar cell module in FIG. 1.

FIG. 14 is a perspective exploded diagram of the photovoltaic solar cell module in FIG. 1.

With reference to FIG. 14, the photovoltaic solar cell module 100 in FIG. 1 includes a plurality of photovoltaic solar cells 130. In addition, the photovoltaic solar cell module 100 further includes a first sealing material 120 and a second sealing material 150 that are disposed on the lower surface and the upper surface, respectively, of each of the plurality of photovoltaic solar cells 130, a rear-surface board 110 disposed on the lower surface of the first sealing material 120, and a front-surface board 160 disposed on the upper surface of the second sealing material 150.

First, the photovoltaic solar cell 130 is a semiconductor element that converts solar energy into a flow of electrons, and is a silicon solar cell, a compound semiconductor solar cell, a tandem solar cell, a dye-sensitized solar cell, a CdTe thin-film solar cell, a CIGS thin-film solar cell, a thin-film solar cell, or the like.

The photovoltaic solar cell module 130 is formed to have a light receiving surface on which sunlight is incident, and a rear surface opposite in direction to the light receiving surface. For example, the photovoltaic solar cell module 130 includes a first conductive silicon substrate, a second conductive semiconductor layer formed on the silicon substrate and has conductivity which is opposite to first conductivity, a reflection-prevention film that includes at least one or more through-hole portions through which a portion of a surface of the second conductive semiconductor layer is exposed and is formed on the second conductive semiconductor layer, a front-surface electrode brought in contact with a portion of a surface of the second conductive semiconductor layer exposed through the at least one or more through-hole portions, and a rear-surface electrode formed on a rear surface of the silicon substrate.

The photovoltaic solar cells 130 are electrically connected in series or in parallel, or in both ways.

Specifically, a plurality of photovoltaic solar cells 130 are electrically connected by a ribbon 133. The ribbon 133 is joined to the front-surface electrode formed on a light receiving surface of a photovoltaic solar cell 130 and the rear-surface electrode formed on the rear surface of another near-by photovoltaic solar cell 130.

In the drawings, it is illustrated that two lines of ribbons 133 are formed, that the photovoltaic solar cells 130 are connected in a row by the ribbon 133, and that a photovoltaic solar cell string 140 is formed via interconnectors 145 connecting adjacent solar cell strings 140.

Accordingly, as illustrated in FIG. 1, six strings are formed and each string includes ten photovoltaic solar cells.

The rear-surface board 110 is a back sheet, and performs functions such as waterproofing, insulating, and ultraviolet-ray blocking. The rear-surface board 110 is a type of Tedlar/PET/Tedlar (TPT), but is not limited to this. In addition, FIG. 4 illustrates that the rear-surface board 110 is in the shape of a rectangle. However, the rear-surface board 110 may be manufactured in various shapes, such as a circle and a semicircle, according to an environment where the photovoltaic solar cell module 100 is installed.

On the other hand, the first sealing material 120, which has the same size as the rear-surface board 110, is attached to be formed on the rear-surface board 110, and a plurality of photovoltaic solar cells 130 are disposed, adjacent to each other, on the first sealing material 120 in order to form several rows of photovoltaic solar cells 300.

The second sealing material 150 is disposed on the photovoltaic solar cell 130 in order to be joined to the first sealing material 120 by lamination.

At this point, the first sealing material 120 and the second sealing material 150 play a role of chemically combining elements of each photovoltaic solar cell with each other. Various examples of the first sealing material 120 and the second sealing material 150 include an Ethylene Vinyl Acetate (EVA) film.

On the other hand, the front-surface board 160 is disposed on the second sealing material 150 in order for sunlight to pass through. It is preferable that the front-surface board 160 is tempered glass in order to protect the photovoltaic solar cell 130 against external physical shock and the like. In addition, it is more preferable that the front-surface board 160 is made of less-iron tempered glass that contains less iron in order to prevent sunlight reflection and increase a sunlight transmittance.

As is apparent from the above description, according to an embodiment of the present invention, a photovoltaic module includes a photovoltaic solar cell module; a junction box disposed on a back surface of the photovoltaic solar cell module and to convert a DC power from the photovoltaic solar cell module and to output the AC power; and a first cable electrically connected to the junction box and to output the AC power; in which the junction box includes an insulating case comprising insulating material, and disposed on the back surface of the photovoltaic solar cell module, a circuit board within the insulating case, and on which a converter for converting a level of the DC power from the photovoltaic solar cell module and an inverter for converting a DC power from the converter into an AC power are mounted, and in which the first cable includes first and second conductive lines for outputting the AC power output from the circuit board, to the outside, without including a grounding line. Accordingly, a separate insulating member does not need to be arranged within the junction box, and thus, a size of the junction box is compactly realized. Particularly, the thickness of the junction box is reduced.

On the other hand, by further including the first cable and the second cable for connecting the first cable from the adjacent solar module, parallel connection with the adjacent solar module becomes possible.

On the other hand, a configuration is employed in which a cable passes through one through-hole formed on the junction box and is then electrically connected to the junction box without a grounding line. Thus, a size of the cable is compactly realized. In addition, a manufacturing cost is reduced.

Particularly, the converter and the inverter within the circuit board are electrically connected to a floating ground. Thus, this provides an advantage in that a separate ground does not need to be separately formed.

On the other hand, the photovoltaic module further includes a plug for supplying the AC power from the cable to an external outlet. The plug includes first and second protrusion portions corresponding to the first and second conductive lines, respectively. Thus, a size of the plug is compactly realized.

On the other hand, the photovoltaic module further includes an interface unit to receive an AC power from a nearby photovoltaic module and the AC power from the cable and to output the AC powers to the outside; and a second cable over which the AC powers from the interface unit are output to the outside. The second cable includes third and fourth conductive lines, without including a grounding line. Thus, a size of the second cable is compactly realized.

On the other hand, the circuit board includes a plurality of conductive layers separated from each other. The converter and the inverter are connected to a first conductive layer among the plurality of conductive layers. The converter and the inverter are electrically connected to the floating ground formed on a second conductive layer separated from the first conductive layer. Thus, electromagnetic interference (EMI) that occurs in the circuit board is reduced.

Particularly, among the plurality of conductive layers, a conductive area of the second conductive layer on which the floating ground is formed is to be greater than a conductive area of the other conductive layers. Thus, the electromagnetic interference (EMI) that occurs in the circuit board is reduced.

On the other hand, a first filter unit for reducing interference is further disposed to be connected to an output terminal of the inverter on the circuit board. Thus, the electromagnetic interference (EMI) that occurs in the circuit board is reduced.

On the other hand, the circuit board is contacted with at least one of the first insulating case and the second insulating case. Accordingly, the thickness of the junction box is reduced.

Particularly, the second conductive layer within the circuit board is contacted with the second insulating case. Thus, the thickness of the junction box is reduced.

On the other hand, a photovoltaic module according to another embodiment of the present invention includes a photovoltaic solar cell module; a first junction box disposed on a back surface of the photovoltaic solar cell module and to include a bypass diode for bypassing a DC power from the photovoltaic solar cell module; a second junction box separated from the first junction box and to convert a DC power from the first junction into a AC power and output the AC power; and a cable electrically connected to the second junction box and to output the AC power, in which the second junction box includes an insulating case comprising insulating material, and disposed on the back surface of the photovoltaic solar cell module, a circuit board within the insulating case, and on which a converter for converting a level of the DC power from the photovoltaic solar cell module and an inverter for converting a DC power from the converter into an AC power are mounted, and in which the cable includes first and second conductive lines for outputting the AC power output from the circuit board, to the outside, without including a grounding line. Accordingly, a separate insulating member does not need to be arranged within the junction box, and thus, the size of the junction box is compactly realized. Particularly, the thickness of the junction box is reduced.

On the other hand, a trunk cable On the other hand,

On the other hand, A trunk cable according to an embodiment of the present invention, comprises: a cable through which an AC power input from an adjacent first solar cell module flows; an interface unit including a first connector connected to a connector of a single output cable through which an AC power from the junction box flows, and a second connector for outputting an AC power to an adjacent second solar module, wherein the AC power from an end of the cable is input to the interface unit; and a third connector connected to the other end of the cable, wherein the cable includes first and second conductive lines for outputting the AC power to the interface unit, without including a grounding line. Accordingly, grounding line does not need to be arranged within the cable, and thus, the size of the cable is compactly realized. Particularly, the thickness of the cable is reduced.

On the other hand, a photovoltaic system according to embodiment of the present invention comprises: a photovoltaic solar cell module; a frame fixed to a plurality of photovoltaic solar cell modules; a plurality of junction boxes to convert a DC power from the respective photovoltaic solar cell module into an AC power and output the AC power; a plurality of single output cables electrically connected to the respective junction box and including first and second conductive lines for outputting the AC power, without including a grounding line; and a plurality of trunk cables connected to the respective single output cable for outputting the AC power. Accordingly, a separate insulating member does not need to be arranged within the junction box, and thus, the size of the junction box is compactly realized. Particularly, the thickness of the junction box is reduced.

The photovoltaic module according to the embodiments of the present invention, as described above, is not applied in such a manner that the configurations and the method are limited, and one or several, or all of the embodiments may be selectively combined for configuration in order to realize various embodiments.

In addition, the desirable embodiments of the present embodiment are described above using the illustrations by the drawings, but the present invention is not limited to the specific embodiments described. It is, of course, apparent to a person of ordinary skill in the related art that various modifications are possible without departing from the gist of the present invention set forth in Claim. The various embodiments should not be individually understood from the technical idea or aspects of the present invention.

What is claimed is:

1. A photovoltaic module comprising:
   a photovoltaic solar cell module;
   a junction box disposed on a back surface of the photovoltaic solar cell module and configured to convert a DC power from the photovoltaic solar cell module into an AC power; and
   a first cable electrically connected to the junction box and configured to output the AC power from the junction box;
   wherein the junction box includes:
   an insulating case comprising an insulating material, and disposed on the back surface of the photovoltaic solar cell module, and
   a circuit board within the insulating case, and on which a converter and an inverter are mounted, the converter being configured to convert a level of the DC power from the photovoltaic solar cell module, and the inverter being configured to convert the DC power from the converter into the AC power,
   wherein the first cable includes two conductive lines, and the two conductive lines include first and second conductive lines for outputting the AC power output from the circuit board to an outside, the first cable not including a grounding line,
   wherein the converter and the inverter are electrically connected to a floating ground,
   wherein the circuit board includes a plurality of conductive layers separated from each other,
   wherein the converter and the inverter are connected to a first conductive layer among the plurality of conductive layers, and
   wherein the converter and the inverter are electrically connected to the floating ground formed on a second conductive layer among the plurality of conductive layers, the second conductive layer being separated from the first conductive layer,
   wherein a third conductive layer is disposed between the first conductive layer and the second conductive layer, and a plurality of conductive lines are formed on the third conductive layer, and a control signal flows through at least one of the plurality of conductive lines,
   wherein a fourth conductive layer is disposed between the first conductive layer and the third conductive layer, and a plurality of conductive lines are formed on the fourth conductive layer, and the DC power from the converter flows through a first conductive line of the plurality of conductive lines of the fourth conductive layer, and the AC power from the inverter flows through a second conductive line of the plurality of conductive lines of the fourth conductive layer, and
   wherein the second conductive layer is formed of a conductive member.

2. The photovoltaic module according to claim 1, wherein the insulating case is made of resin, the resin including at least one of polycarbonate, polyethylene, polyethylene ether, and polystyrene.

3. The photovoltaic module according to claim 1, further comprising a connector connected to an end of the first cable for connection to an adjacent solar module or the outside.

4. The photovoltaic module according to claim 1, wherein the insulating case comprises:
   a first insulating case for accommodating the circuit board; and
   a second insulating case formed on the first case, and covering the circuit board.

5. The photovoltaic module according to claim 4, further comprising an insulating member not disposed between the first insulating case and the circuit board, or between the second insulating case and the circuit board.

6. The photovoltaic module according to claim 4, wherein the junction box further includes an insulating member disposed between the first insulating case and the circuit board.

7. The photovoltaic module according to claim 1, further comprising a coating layer formed on a back surface of the circuit board.

8. The photovoltaic module according to claim 1, further comprising:
   a plug for supplying the AC power from the first cable to an external outlet,
   wherein the plug includes first and second protrusion portions corresponding to the first and second conductive lines of the first cable, respectively.

9. The photovoltaic module according to claim 1, further comprising a controller for controlling the converter and the inverter, the controller being mounted on the circuit board, and
   wherein the control signal from the controller flows through at least one conductive line of the plurality of conductive lines of the third conductive layer among the plurality of conductive layers.

10. The photovoltaic module according to claim 1, further comprising a first filter unit for reducing interference, the first filter unit being disposed at an output terminal of the inverter on the circuit board.

11. The photovoltaic module according to claim 10, further comprising a second filter unit for reducing interference, the second filter unit being disposed at an input terminal of the converter.

12. A photovoltaic system comprising:
   a plurality of photovoltaic solar cell modules;
   a plurality of junction boxes to convert a DC power from respective photovoltaic solar cell modules into an AC power;
   a plurality of single output cables electrically connected to respective junction boxes of the plurality of junction boxes, and including first and second conductive lines for outputting the AC power; and
   a plurality of trunk cables connected to respective single output cables of the plurality of single output cables for outputting the AC power,
   wherein the respective single output cable includes two conductive lines, and the two conductive lines include the first and second conductive lines for outputting the AC power, the respective single output cable not including a grounding line,
   wherein each of the plurality of junction boxes includes a converter being configured to convert a level of the DC power from the photovoltaic solar cell module, and an inverter being configured to convert the DC power from the converter into the AC power,
   wherein the converter and the inverter are electrically connected to a floating ground,
   wherein the converter and the inverter are mounted on a circuit board,
   wherein the circuit board includes a plurality of conductive layers separated from each other,
   wherein the converter and the inverter are connected to a first conductive layer among the plurality of conductive layers,
   wherein the converter and the inverter are electrically connected to the floating ground formed on a second conductive layer among the plurality of conductive layers, the second conductive layer being separated from the first conductive layer,
   wherein a third conductive layer is disposed between the first conductive layer and the second conductive layer, and a plurality of conductive lines are formed on the third conductive layer, and a control signal flows through at least one of the plurality of conductive lines, and lines,
   wherein a fourth conductive layer is disposed between the first conductive layer and the third conductive layer, and a plurality of conductive lines are formed on the fourth conductive layer, and the DC power from the converter flows through a first conductive line of the plurality of conductive lines of the fourth conductive layer, and an AC power from the inverter flows through a second conductive line of the plurality of conductive lines of the fourth conductive layer, and
   wherein the second conductive layer is formed of a conductive member.

13. The photovoltaic system according to claim 12, wherein each trunk cable of the plurality of trunk cables comprises:
   a cable through which an AC power input from an adjacent first solar cell module flows;
   an interface unit including a first connector connected to a connector of a single output cable through which an AC power from a junction box flows, and a second connector for outputting the AC power from the junction box to an adjacent second solar module, wherein the AC power of the cable from an end of the cable is input to the interface unit; and
   a third connector connected to another end of the cable,
   wherein the cable includes third and fourth conductive lines for outputting the AC power to the interface unit, the cable not including a grounding line.

* * * * *